United States Patent

Katata et al.

[19]

[11] Patent Number: 6,023,299
[45] Date of Patent: Feb. 8, 2000

[54] VIDEO CODING DEVICE AND VIDEO DECODING DEVICE

[75] Inventors: Hiroyuki Katata; Hiroshi Kusao; Norio Ito, all of Chiba; Toshio Nomura, Ichihara, all of Japan

[73] Assignee: Sharp Kabushiki Kaisha, Osaka, Japan

[21] Appl. No.: 09/289,196

[22] Filed: Apr. 9, 1999

Related U.S. Application Data

[62] Division of application No. 08/661,651, Jun. 11, 1996.

[30] Foreign Application Priority Data

Jul. 14, 1995 [JP] Japan .................................. 7-178642
Jul. 14, 1995 [JP] Japan .................................. 7-178643
Oct. 24, 1995 [JP] Japan .................................. 7-275501

[51] Int. Cl.[7] ............................. H04N 7/12; H04N 11/02; H04N 11/04
[52] U.S. Cl. .......................................... 348/415; 348/397
[58] Field of Search ................................... 348/397, 398, 348/399, 400, 401, 408, 409, 415, 586; 382/232, 234, 236, 238, 242, 243; H04N 7/12, 11/02, 11/04

[56] References Cited

U.S. PATENT DOCUMENTS

| | | |
|---|---|---|
| 5,132,792 | 7/1992 | Yonemitsu et al. . |
| 5,136,659 | 8/1992 | Kaneko et al. ............................ 382/16 |
| 5,155,594 | 10/1992 | Bernstein et al. . |
| 5,260,783 | 11/1993 | Dixit ........................................ 358/136 |
| 5,262,856 | 11/1993 | Lippman et al. . |
| 5,274,453 | 12/1993 | Maeda . |
| 5,408,274 | 4/1995 | Chang et al. . |
| 5,488,411 | 1/1996 | Lewis . |
| 5,608,458 | 3/1997 | Chen et al. ............................... 348/413 |
| 5,684,887 | 11/1997 | Lee et al. . |

FOREIGN PATENT DOCUMENTS

| | | |
|---|---|---|
| 549025 | 2/1993 | Japan . |
| 6223155 | 8/1994 | Japan . |
| 7030888 | 1/1995 | Japan . |

OTHER PUBLICATIONS

Hiroyuki Katata et al.; "Auto Face–Tracking and Its Application to Very Low Bitrate Video Coding", ISO/IEC JTC1/Sc29/WG11, MPEG 95/030, Mar. 1995/Luasanne.
"Real–Time Auto Face–Tracking System"; (The Institute of Image Electronics Engineers of Japan, Previewing Report of Society Meeting Apr. 4, 1993; pp. 13–16).
"Temporal Scalability Based on Image Content"; (ISO/IEC JTC1/ SC29/WG MPEG95/211, (1995)).
Layer Representation for Motion Analysis, IEEE, by Wang and Adelson, p. 361–366.
Layered Representation for Image Sequence Coding, IEEE, by Wang and Adelson, pp. V–221 to V–224.
"An Image Coding Scheme Using Layered Representation and Multiple Templates", IEICE, by Etoh et al., pp. 99–106.
Technical Report of IEICE, Minoru Etoh et al.; "An Image Coding Scheme Using Layered Representation and Multiple Templates"; 1995–1996; pp. 99–106.

*Primary Examiner*—Howard Britton
*Assistant Examiner*—Nhon T Diep

[57] ABSTRACT

A video coding device capable of making coded data have a hierarchical structure, a specified area of each frame is selected. The position and the shape of the selected area are encoded, a pixel value of the selected area is encoded as lower-layer coded data, a pixel value of a whole image is encoded as first upper-layer coded data by using pixel values of already decoded images of the lower-layer and the first upper layer and a pixel value of the selected area is encoded as second upper-layer coded data by using pixel values of already decoded images of the lower-layer and the second upper layer.

7 Claims, 35 Drawing Sheets

FIG.4
DECODING:ALL LAYERS
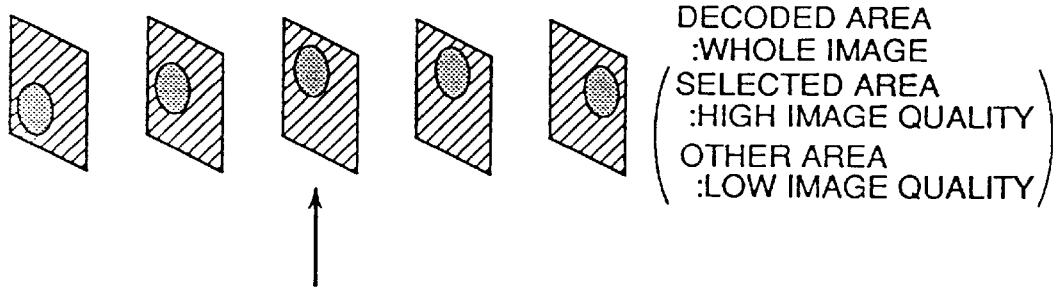
DECODED AREA
 :WHOLE IMAGE
(SELECTED AREA
   :HIGH IMAGE QUALITY
 OTHER AREA
   :LOW IMAGE QUALITY)
DECODING
 :TO SECOND UPPER-LAYER
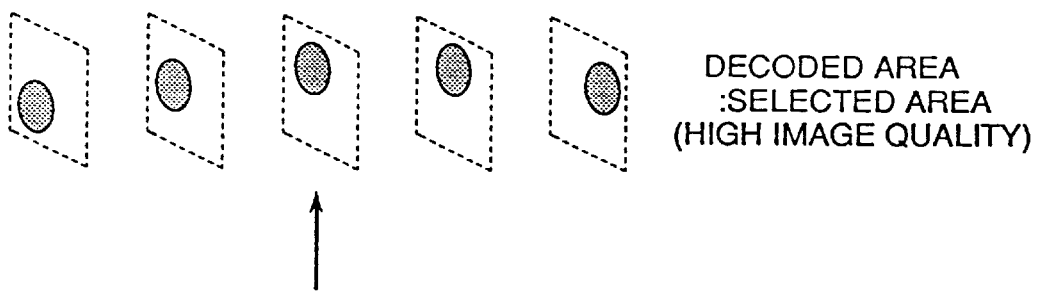
DECODED AREA
 :SELECTED AREA
 (HIGH IMAGE QUALITY)
DECODING
 :TO LOWER-LAYER
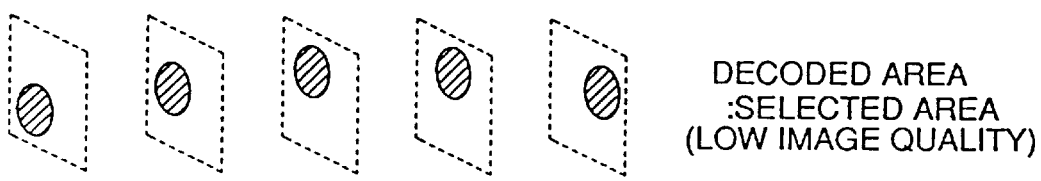
DECODED AREA
 :SELECTED AREA
 (LOW IMAGE QUALITY)

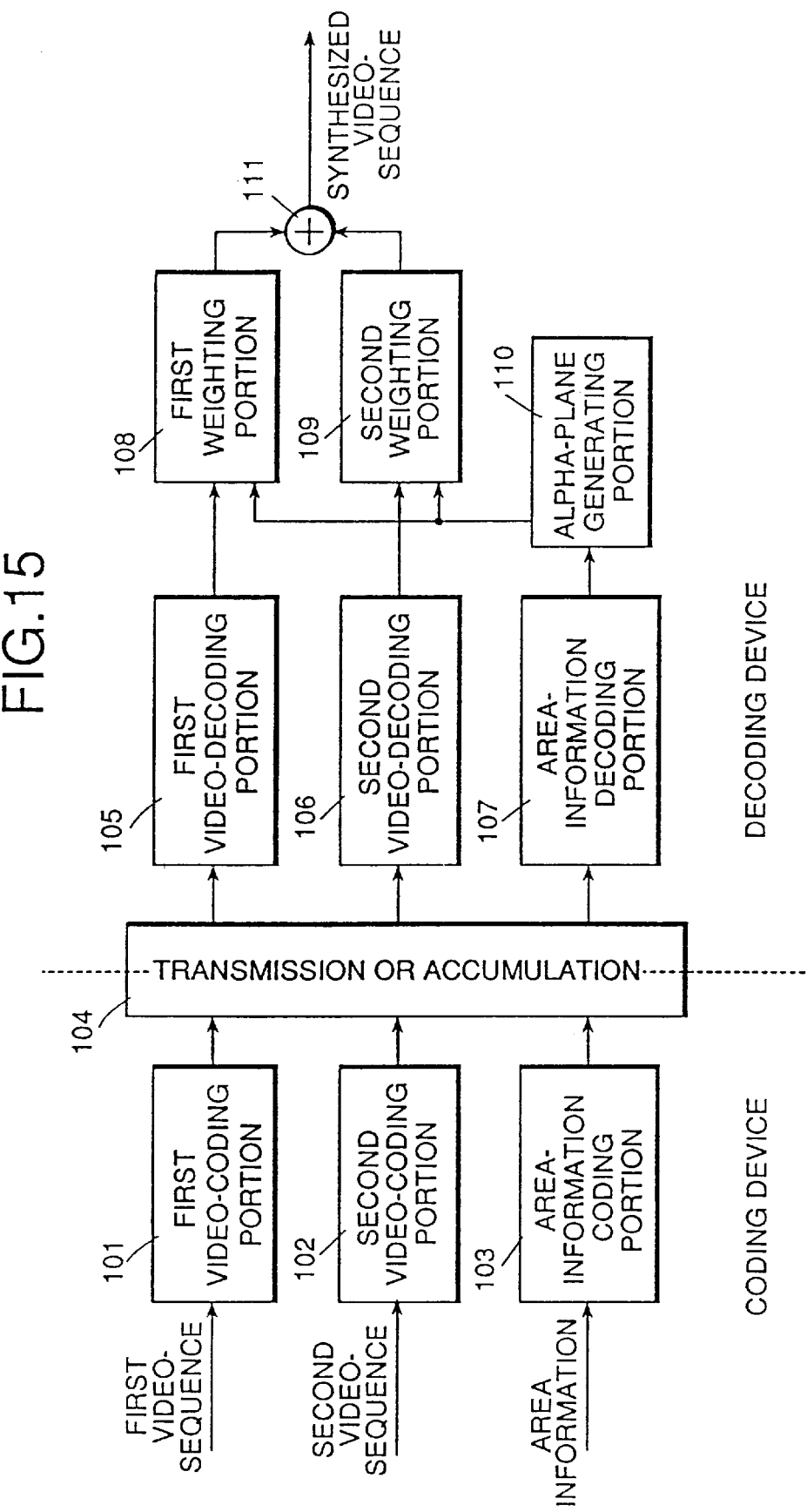

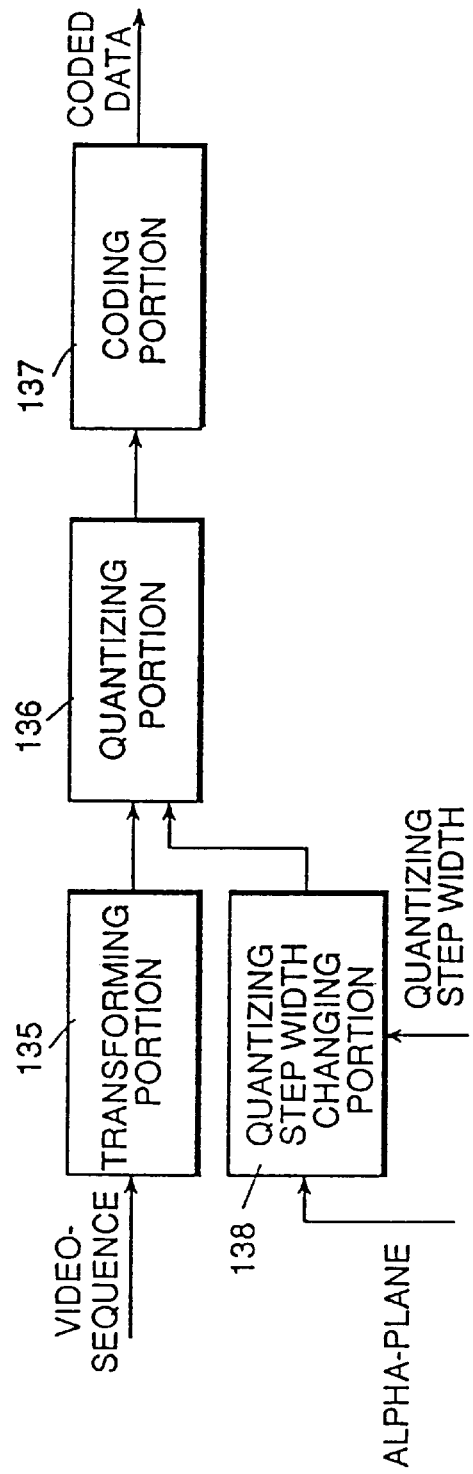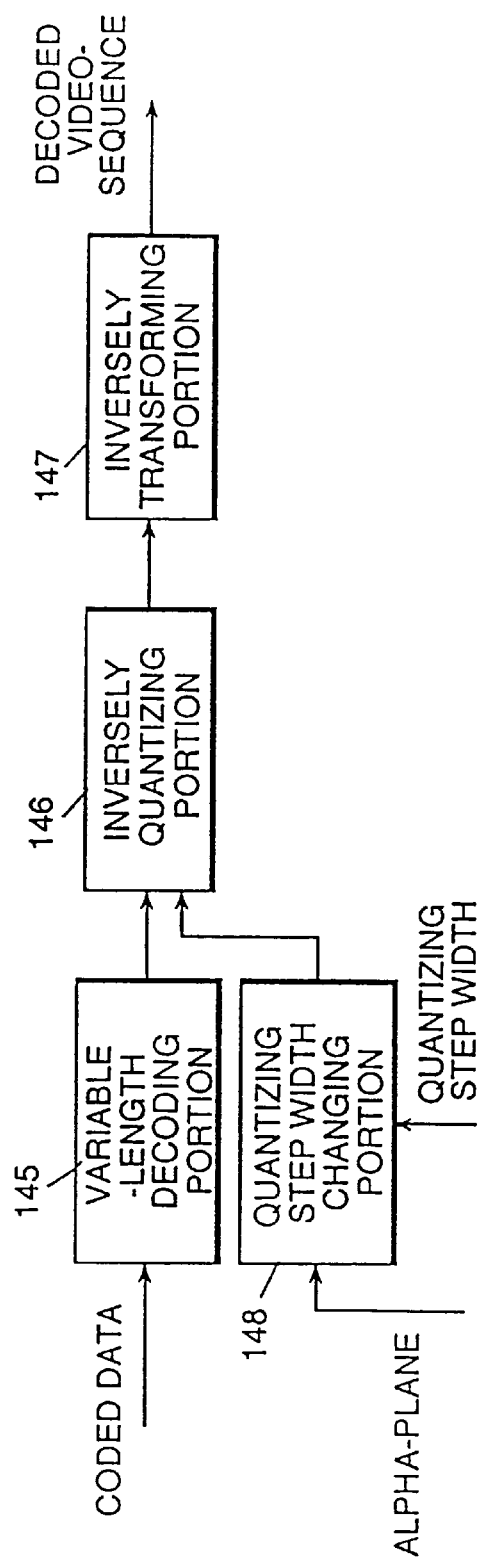

A  
LOWER-LAYER 1

B  
UPPER-LAYER  
(a)

C  
LOWER-LAYER 2

(b)

(c)

FIG.37
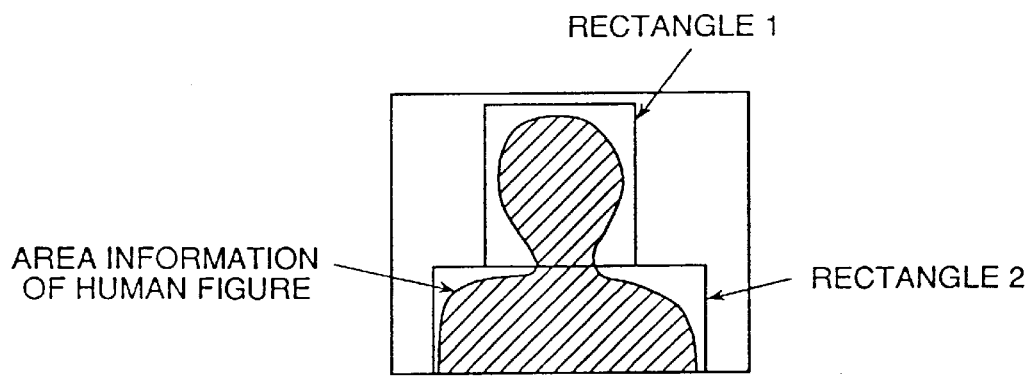
FIG.39
(a)
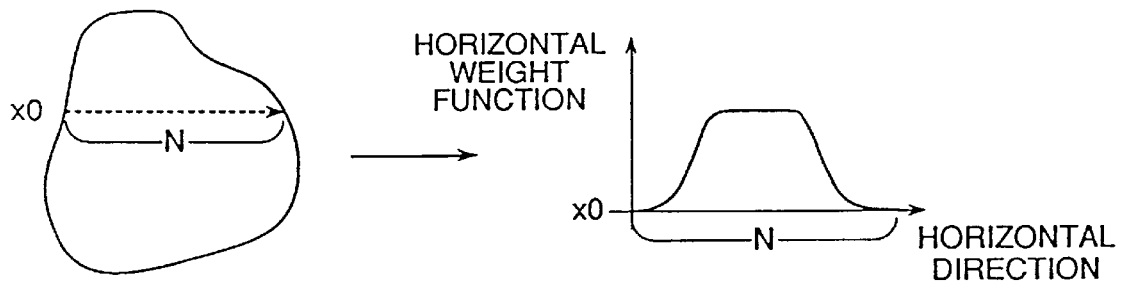
(b)
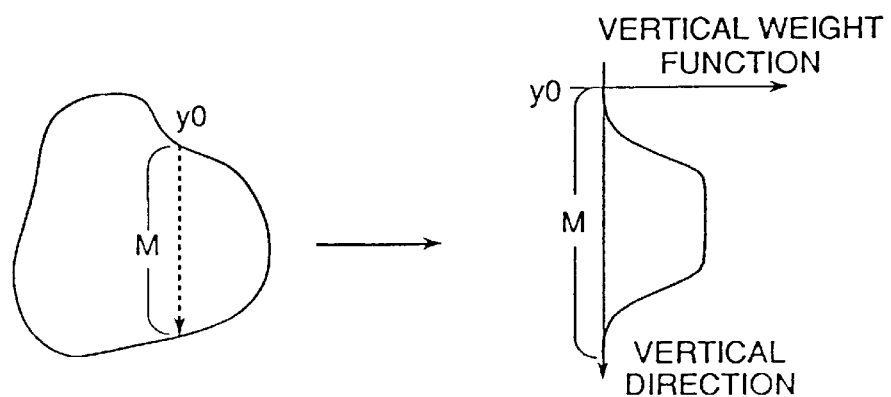

VIDEO CODING DEVICE AND VIDEO DECODING DEVICE

This application is a divisional of copending application Ser. No. 08/661,651, filed on Jun. 11, 1996, the entire contents of which are hereby incorporated by reference.

BACKGROUND OF THE INVENTION

The present invention pertains to the field of art for digital video processing and relates particularly to a video coding device for encoding video data at a high efficiency and a video decoding device for decoding coded data prepared by said video coding device at a high efficiency.

There has been proposed a video coding method which is capable of encoding a specified area to be of a higher image quality than that of other areas.

A video coding method described in references ISO/IEC JTC1/SC29/WG11 MPEG95/030 is such that selects a specified area and makes it (hereinafter referred to as selected area) encoded to have a higher image quality by controlling quantizer step sizes and time resolution.

Another conventional method shows an area-selecting portion intended to select a specified area of a video image. In case of selecting, e.g., a face area of a video image on a display of a video telephone, it is possible to select an area by using a method that is described in a reference material "Real-time auto face-tracking system (The Institute of Image Electronics Engineers of Japan, Previewing Report of Society Meeting, 93-04-04, pp. 13–16, 1993).

An area-position-and-shape coding portion encodes a position and a shape of a selected area. An optional shape may be encoded by using, e.g., chain codes. The coded position and shape are assembled into coded data and transferred or accumulated by a coded-data integrating portion.

A coded-parameter adjusting portion adjusts a variety of parameters usable for controlling image quality or data amount in video encoding so that the area-position-and-shape coding position may encode a selected area to get a higher image quality than that of other areas.

A parameter coding portion encodes a variety of adjusted parameters. The coded parameters are assembled into coded data and transferred or accumulated by a coded-data integrating portion. The video coding portion encodes input video data by using a variety of the parameters by a combination of conventional coding methods such as motion compensative prediction, orthogonal transformation, quantization and variable length coding. The coded video data is assembled into a coded data by the coded data integrating portion, then the coded data is transferred or accumulated.

The selected area is thus encoded to have a higher image quality than that of other areas.

As mentioned above, the conventional art improves quality of a selected area image by allocating more quantity of bits thereto by adjusting parameters such as quantizer step sizes, spatial resolution, time resolution. The conventional art, however, includes such problems that it can not obtain a specified area image by decoding a part of decoded data and/or obtain a decoded area image having a relatively low quality because of a selected area and other areas being included in the same group of coded data. Recently, many studies have been made on hierarchical structure of coded data but have not succeeded in creating a system that allows the selection of a specified area.

There has been studied a video coding method which is adapted to synthesize different kinds of video sequences.

A paper "Image coding using hierarchical representation and multiple templates" appeared in Technical Report of IEICE (Institute of Electronics Information and Communication Engineers) IE94-159, pp. 99–106, 1995, describes such an image synthesizing method that combines a video-sequence being a background video and a part-video-sequence being a foreground video (e.g., a figure image or a fish image cut-out by using the chromakey technique) to produce a new sequence.

In a conventional method, a first video-sequence is assumed to be a background video and a second video-sequence is assumed to be a part video. An alpha plane is weight data used when synthesizing a part image with a background image in a moving picture (video) sequence. There has been proposed an exemplified image made of pixels weighted with values of 1 to 0. The alpha-plane data is assumed to be 1 within a part and 0 out of a part. The alpha data may have a value of 0 to 1 in a boundary portion between a part and the outside thereof in order to indicate a mixed state of pixel values in the boundary portion and transparency of transparent substance such as glass.

In the conventional method, a first video-coding portion encodes the first video-sequence and a second video-coding portion encodes the second video-sequence according to an international standard video-coding system, e.g., MPEG or H.261. An alpha-plane coding portion encodes an alpha-plane. In the above-mentioned paper, this portion uses the techniques of vector value quantizing and Haar transformation. A coded-data integrating portion (not shown) integrates coded data received from the coding portions and accumulates or transmits the integrated coded data.

In the decoding device of the conventional method, a coded-data dissembling portion (not shown) disassembles coded data into the coded data of the first video-sequence, the coded data of the second video-sequence and the coded data of the alpha-plane, which are then decoded respectively by a first video-decoding portion, a second video-decoding portion and an alpha-plane decoding portion. Two decoded sequences are synthesized according to weighted mean values by a first weighting portion, a second weighting portion and adder. The first video-sequence and the second video-sequence are combined according to the following equation:

$$f(x,y,t)=(1-\alpha(x,y,t))f1(x,y,t)+\alpha(x,y,t)f2(x,y,t)$$

In the equation, (x,y) represents coordinate data of an intraframe pixel position, t denotes a frame time, f1(x,y,t) represents a pixel value of the first video sequence, f2(x,y,t) represents a pixel value of the second video sequence, f(x,y,t) represents a pixel value of the synthesized video sequence and α(x,y,t) represents alpha-plane data. Namely, the first weighting portion uses 1−α(x,y,t) as a weight while the second weighting portion uses α(x,y,t) as a weight. As mentioned above, the conventional method produces a large number of coded data because it must encode alpha-plane data.

To avoid this problem, saving the information amount by binarizing alpha-plane data may be considered, but it is accompanied by such a visual defect that tooth-like line appears at the boundary between a part image and a background as the result of discontinuous change of pixel values thereabout.

There has been studied a video coding method that is adapted to synthesize different kinds of video sequences.

A paper "Image coding using hierarchical representation and multiple templates" appeared in Technical Report of IEICE IE94-159, pp. 99–106, 1995, describes such an image synthesizing method that combines a video-sequence being a background video and a part-video-sequence being a foreground video (e.g., a figure image or a fish image cut-out by using the chromakey technique) to produce a new sequence.

A paper "Temporal Scalability based on image content" (ISO/IEC JTC1/SC29/WG11 MPEG95/211, (1995)) describes a technique for preparing a new video-sequence by synthesizing a part-video sequence of a high frame rate with a video-sequence of a low frame rate. This system is to encode an lower-layer frame at a low frame-rate by prediction coding method and to encode only a selected area of an upper-layer frame at a high frame rate by prediction coding. The upper layer does not encode a frame coded at the lower-layer and uses a copy of the decoded image of the lower-layer. The selected area may be considered to be a remarkable part of image, e.g., a human figure.

In a conventional method, at the coding side, an input video-sequence is thinned by a first thinning portion and a second thinning portion and the thinned video-sequence with a reduced frame rate is then transferred to an upper-layer coding portion and an lower-layer coding portion respectively. The upper-layer coding portion has a frame rate higher than that of the lower-layer coding portion.

The lower-layer coding portion encodes a whole image of each frame in the received video-sequence by using an international standard video-coding method such as MPEG, H.261 and so on. The lower-layer coding portion also prepares decoded frames which are used for prediction coding and, at the same time, are inputted into a synthesizing portion.

In a code-amount control portion of a conventional coding portion, a coding portion encodes video frames by using a method or a combination of methods such as motion compensative prediction, orthogonal transformation, quantization, variable length coding and so on. A quantization-width (step-size) determining portion determines a quantization width (step size) to be used in a coding portion. A coded-data amount determining portion calculates an accumulated amount of generated coded data. Generally, the quantization width is increased or decreased to prevent increase or decrease of coded data amount.

The upper-layer coding portion encodes only a selected part of each frame in a received video-sequence on the basis of an area information by using an international standard video-coding method such as MPEG, H.261 and so on. However, frames encoded at the lower-layer coding portion are not encoded by the upper-layer coding portion. The area information is information indicating a selected area of, e.g., an image of a human figure in each video frame, which is a binarized image taking 1 in the selected area and 0 outside the selected area. The upper-layer coding portion also prepares decoded selected areas of each frame, which are transferred to the synthesizing portion.

An area-information coding portion encodes an area information by using 8-directional quantizing codes. The 8-directional quantizing code is a numeric code indicating a direction to a proceeding point and it is usually used for representing digital graphics.

A synthesizing portion outputs a decoded lower-layer video-frame which has been encoded by lower-layer coding portion and is to be synthesized. When a frame to be synthesized but has not been encoded at the lower-layer coding portion, the synthesizing portion outputs a decoded video-frame that is generated by using two decoded frames, which have been encoded at the lower-layer and stand before and after the lacking lower-layer frame, and one decoded upper-layer frame to be synthesized. The two lower-layer frames stand before and after the upper-layer frame. The synthesized video-frame is inputted into the upper-layer coding portion to be used therein for predictive coding. The image processing in the synthesizing portion is as follows:

An interpolating image is first prepared for two lower-layer frames. A decoded image of the lower-layer at time t is expressed as $B(x,y,t)$, where x and y are co-ordinates defining the position of a pixel in a space. When the two decoded images of the lower-layer are located at time t1 and t2 and the decoded image of the upper-layer is located at t3 ($t1<t3<t2$), the interpolating image $I(x,y,t3)$ of time t3 is calculated according to the following equation (1):

$$I(x,y,t3)=[(t2-t3)B(x,y,t1)+(t3-t1)B(x,y,t2)]/(t2-t1) \qquad (1)$$

The decoded image E of the upper layer is then synthesized with the obtained interpolating image I by using synthesizing weight information $W(x,y,t)$ prepared from area information. A synthesized image S is defined according to the following equation:

$$S(x,y,t)=[1-W(x,y,t)]I(x,y,t)+E(x,y,t)W(x,y,t) \qquad (2)$$

The area information $M(x,y,t)$ is a binarized image taking 1 in a selected area and 0 outside the selected area. The weight information $W(x,y,t)$ can be obtained by processing the above-mentioned binarized image several times with a low-pass filter. Namely, the weight information $W(x,y,t)$ takes 1 within a selected area, 0 outside the selected area and a value of 0 to 1 at boundary of the selected area.

The coded data prepared by the lower-layer coding portion, the upper-layer coding portion and the area information coding portion is integrated by an integrating portion (not shown) and then is transmitted or accumulated.

In the decoding side of the conventional system, a coded data disassembling portion (not shown) separates coded data into lower-layer coded data, upper-layer coded data and area-information coded data. These coded data are decoded respectively by an lower-layer decoding portion, an upper-layer decoding portion and an area information decoding portion.

A synthesizing portion of the decoding side is similar in construction to the synthesizing portion. It synthesizes an image by using a decoded lower-layer image and a decoded upper-layer image according to the same method as described at the coding side. The synthesized video frame is displayed on a display screen and, at the same time, is inputted into the upper layer decoding portion to be used for prediction thereat.

The above-described decoding device decodes both lower-layer and the upper-layer frames, but a decoding device consisting of an lower-layer decoding portion is also applied, omitting the upper-layer coding portion and the synthesizing portion. This simplified decoding device can reproduce a part of coded data.

Problems to be solved by the present invention:
(1) As mentioned above, the conventional art obtains an output image from two lower-layer decoded images and one upper-layer decoded image by previously preparing an interpolating image of two lower-layer frames and, therefore, encounters such a problem that the output image may be considerably deteriorated with a large distortion occurred around a selected area therein if the position of said selected area changes with time.

The above-mentioned problem is described as follows:

Images A and C are two decoded lower-layer frames and an image B is a decoded upper-layer frame. The images are displayed in the time order A, B and C. Because the selected area moves, an interpolating image determined from the images A and B shows two selected areas overlapped with each other. The image B is further synthesized with the interpolating image by using weight information. An output image has three selected areas overlapped with each other. Two selected areas of the lower-layer image appear like-afterimage around the selected area image of the upper-layer, thereby considerably deteriorating the quality of an image. Because the lower-layer frames are normal and only synthesized frames have the above-mentioned distortion, the video sequence may be displayed with periodical flicker-like distortion that considerably impairs the video image-quality.

(2) The conventional art uses eight-directional quantizing codes for encoding area information. In case of encoding the area-information of a low bit-rate or of a complicated-shape area, an amount of coded area-information increases and takes a large portion of the total amount of coded data, that may cause the deterioration of the image quality.

(3) The conventional art obtains weight information by making the area information pass through a low-pass filter several times. This increases an amount of processing operations.

(4) The conventional art uses predictive coding method. However, the predictive coding the lower-layer frames may cause a large distortion if a screen change occurs in a video sequence. The distortion of any lower-layer frame may propagate a related upper-layer images, resulting in the prolonged distortion of the video.

(5) According to the conventional art, each lower-layer frame is encoded by using an international standard video-coding method (e.g., MPEG and H.261), thereby a selected area image differs little in quality from other areas. On the contrary, in each upper-layer frame, only a selected area is encoded to be of a high quality, thereby the quality of the selected area image may vary with time. This is sensed as a flicker-like distortion that is a problem.

SUMMARY OF THE INVENTION

Accordingly, an object of the present invention is to provide coding and decoding devices which are capable of encoding a selectively specified area of a video image to be of a relatively high image-quality in a whole coded video data system and which is also capable of giving a hierarchical structure of the coded data, make it possible to reproduce the specified area of the coded video image to be of a variety of image-quality and/or and any other area to be of a relatively low image-quality.

With the thus constructed coding and decoding devices, a selected area of an image can be encoded and decoded to be of a higher image-quality than that of other areas by differentiating values of parameters such as spatial resolution, quantizer step sizes and time resolution. The coding device can make coded data have respective hierarchical orders and, therefore, the decoding device can easily decode a part of coded data.

Another object of the present invention is to provide a coding device and a decoding device, which are capable of generating a synthesized image from a reduced amount of coded data without deterioration of the synthesized image quality.

With the coding and decoding devices according to the present invention, the decoding device can prepare weight information for synthesizing a plurality of video-sequences by using weighted means, eliminating the necessity of encoding weight information by the coding device.

The coded data are weighted, that may totally save an amount of data to be produced.

The reverse weighting, which is performed by the decoding side, may generates weight-removed decoded data.

Another object of the present invention is to provide a coding device and a decoding device, which are free from the above-mentioned problems (described (1) to (5) as problems to be solved in prior art) and are capable of encoding video-frames with a reduced amount of coded data without deterioration of the image quality.

BRIEF DESCRIPTION OF THE DRAWINGS

FIG. 4 shows another example of a concept of decoding method according to the present invention.

FIG. 14 shows an example of an alpha plane according to a conventional method.

FIG. 15 is a block diagram for explaining an embodiment of the present invention.

FIG. 16 shows an example of an area information according to the present invention.

FIG. 22 is a block diagram for explaining another example of a video-coding portion in another embodiment of the present invention.

FIG. 23 is a block diagram for explaining another example of a video-decoding portion in another embodiment of the present invention.

FIG. 37 shows an example of approximating an area information by using rectangles.

FIG. 39 shows an exemplified method for preparing weighting information according to the present invention.

PREFERRED EMBODIMENT OF THE INVENTION

Figure 1:
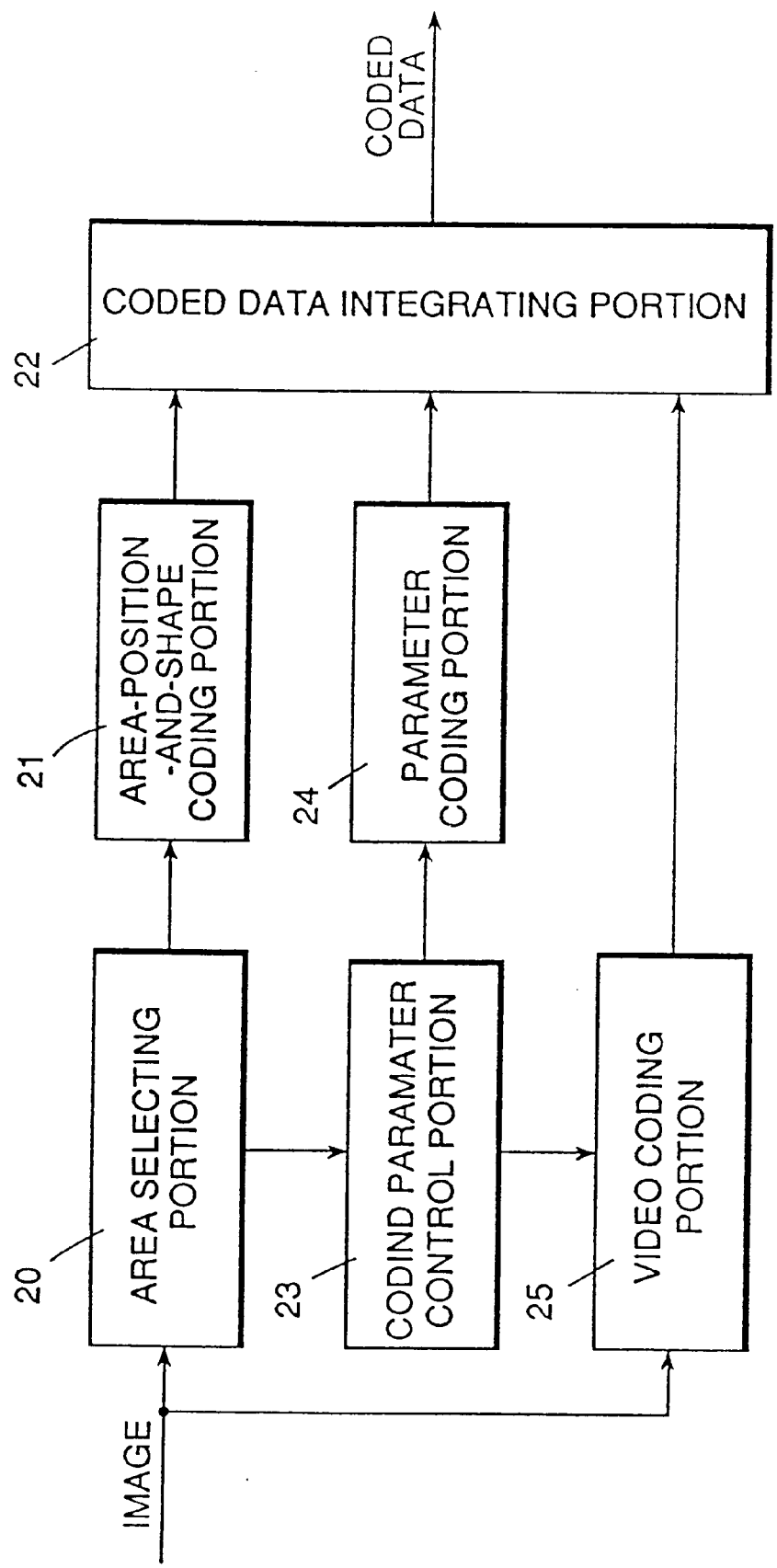
FIG. 1 is a block diagram for explaining a prior art.

FIG. 1 is a block diagram showing a prior art as a reference to the present invention. An area-selecting portion 20 is intended to select a specified area of a video image. In case of selecting, e.g., a face area of a video image on a display of a video telephone, it is possible to select an area by using a method that is described in a reference material "Real-time auto face-tracking system (The Institute of Image Electronics Engineers of Japan, Previewing Report of Society Meeting, pp. 13–16, 1993).

In FIG. 1, an area-position-and-shape coding portion 21 encodes a position and a shape of a selected area. An optional shape may be encoded by using, e.g., chain codes. The coded position and shape are assembled into coded data and transferred or accumulated by a coded-data integrating portion 22.

A coded-parameter adjusting portion 23 adjusts a variety of parameters usable for controlling image quality or data amount in video encoding so that the area-position-and-shape coding position 21 may encode a selected area to get a higher image quality than that of other areas.

Figure 2:
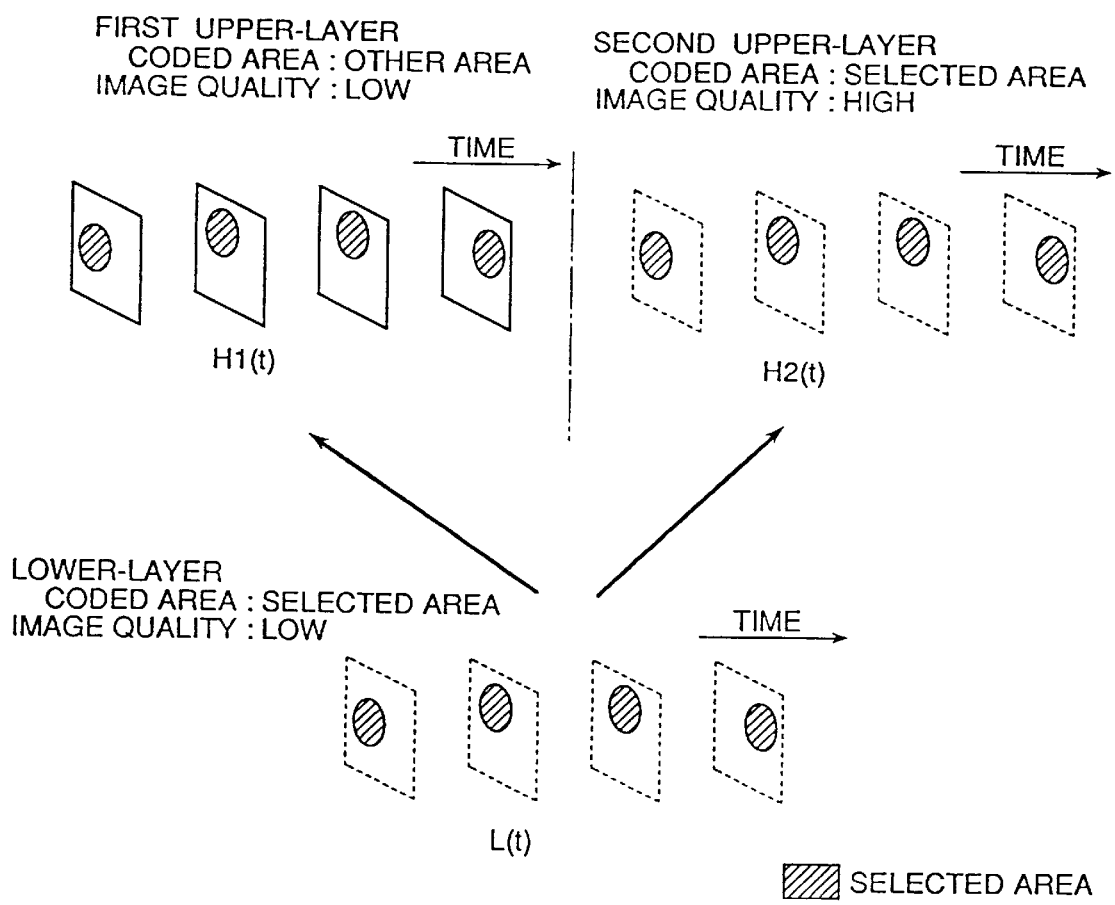
FIG. 2 is a view for explaining a concept of coding method according to the present invention.

A parameter coding portion 24 encodes a variety of adjusted parameters. The coded parameters are assembled into coded data and transferred or accumulated by a coded-data integrating portion 22. The video coding portion 25 encodes input video data by using a variety of the parameters by a combination of conventional coding methods such as motion compensative prediction, orthogonal transformation, quantization and variable length coding. The coded video data is assembled into a coded data by the coded data integrating portion 22, then the coded data is transferred or accumulated. The concept of the present invention will be described as follows:

FIG. 2 is a view for explaining the concept of encoding method according to the present invention. The hierarchical encoding method of the present invention uses one lower-layer (lower level) and two upper layers (higher levels). At the lower-layer, a selected area (hatched area) is encoded with a relatively low image-quality. A remarkable time is denoted by t and a decoded image of the time t is denoted by L(t). At the first upper layer, a whole image is encoded to be of a relatively low image-quality. A decoded image of this layer is denoted by H1(t). In this case, predictive coding is made by using the decoded image of the lower-layer L(t) and the decoded image of the first upper-layer H1(t-1). At the second upper layer, only the selected area is predictively encoded to be of a higher image-quality than that at the lower-layer. The decoded image of this layer is denoted by H2(t). In this case, predictive coding is made by using decoded image of the lower-layer L(t) and the decoded image of the second upper-layer H2(t-1).

Figure 3:
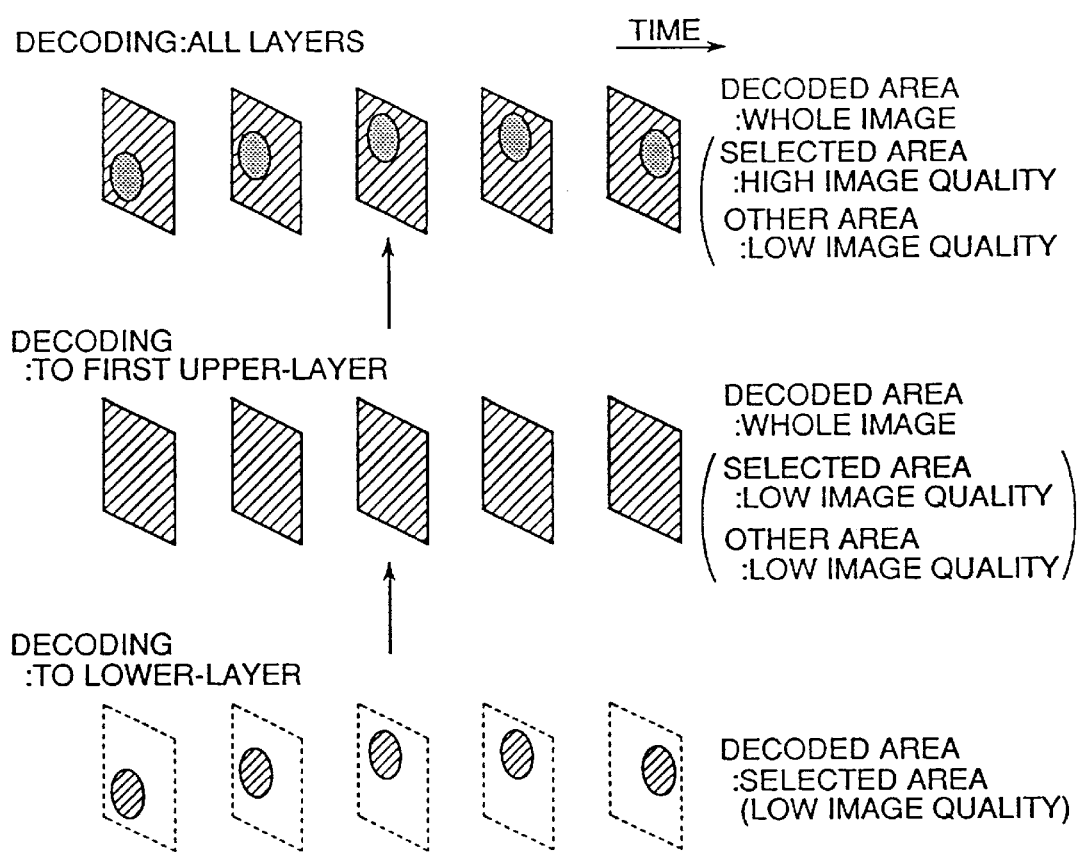
FIG. 3 shows an example of a concept of decoding method according to the present invention.

FIGS. 3 and 4 are illustrative of the concept of decoding method according to the present invention. FIG. 3 shows three-layer decoding processes: decoding only lower-layer data, decoding only the first upper-layer data and decoding all layers data. In this case, decoding the lower-layer data reproduces only an image selected by the coding device to be of a relatively low image-quality, decoding the first upper-layer data reproduces a whole image of a relatively low image-quality and decoding all coded data reproduces the selected area of a higher image-quality and all other areas of a lower image-quality. On the other hand, FIG. 4 shows a case when all coded signals are decoded after decoding the second upper-layer data instead of the first upper-layer data. In this case, an intermediate layer (the second upper-layer) data is decoded to reproduce a selected image-area only of a higher image-quality.

With the decoding device according to the present invention, only a selected image area of a lower image-quality is reproduced from coded data corresponding to the lower-layer while a whole image of a lower image-quality or only a selected area of a higher image-quality is reproduced from coded data corresponding to the upper layer. Namely, any one of two upper layers above a common lower-layer can be selected.

Figure 5:
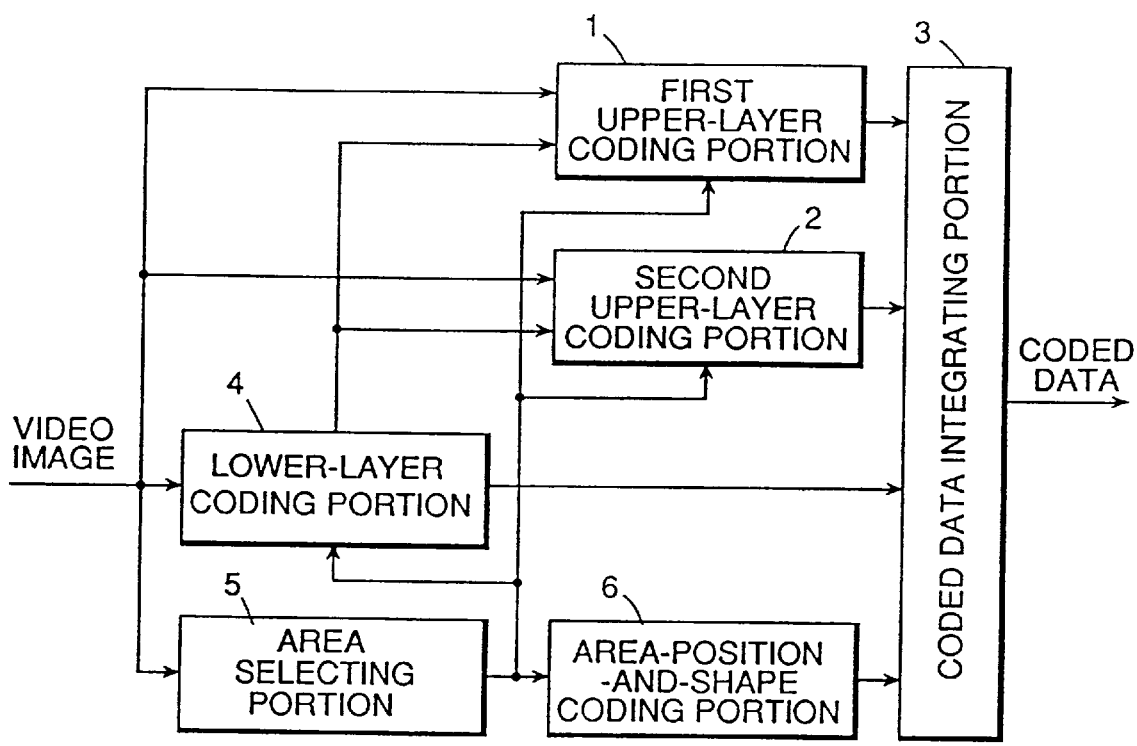
FIG. 5 is a block diagram showing a coding device representing an embodiment of the present invention.

An embodiment of the present invention will be described as follows:

FIG. 5 is a block diagram showing a coding device embodying the present invention.

In FIG. 5, an area selecting portion 5 and an area-position-and-shape coding portion 6 are similar in function to those of the prior art shown in FIG. 1.

In FIG. 5, an lower-layer coding portion 4 encodes only an area selected by the area selecting portion 5 to be of a lower image-quality, prepares coded data of the lower-layer and generates a decoded image from the coded data. The decoded image is used as a reference image for predictive coding.

A first-layer coding portion 1 encodes a whole image to be of a lower image-quality, prepares coded data of the first-layer and generates a decoded image from said coded data. The decoded image is used as a reference image for predictive coding.

A second-layer coding portion 2 encodes only a selected area image to be of a higher image-quality, prepares coded data of the second-layer and generates a decoded image from said coded data. The decoded image is used as a reference image for predictive coding.

A coded data integrating portion 3 integrates selected-area position-and-shape codes, lower-layer coded data, first upper-layer coded data and second upper-layer coded data.

Figure 6:
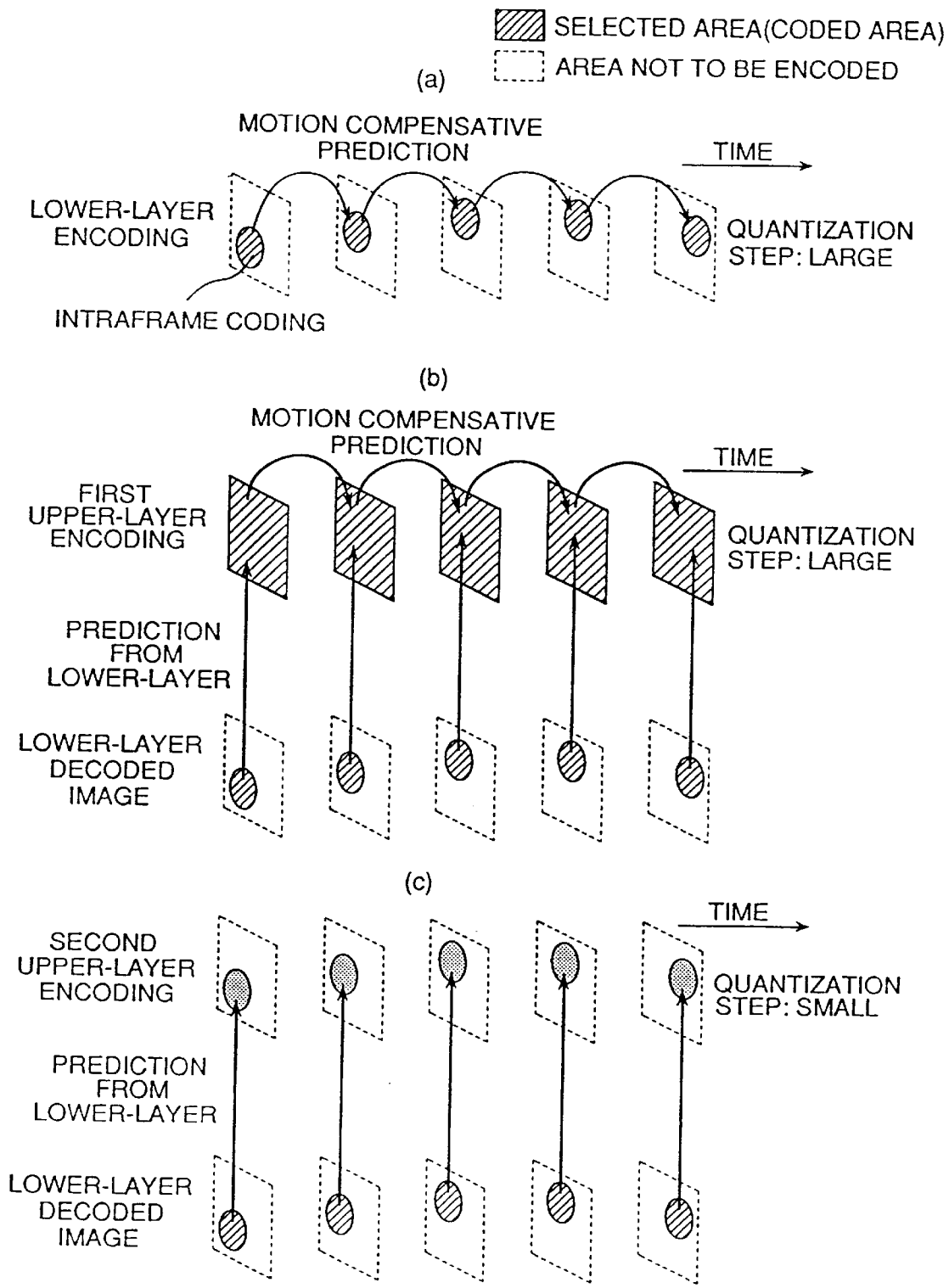
FIG. 6 shows an exemplified method of encoding lower-layer, first upper-layer and second upper-layer coded data by a coding device according to the present invention.
Figure 7:
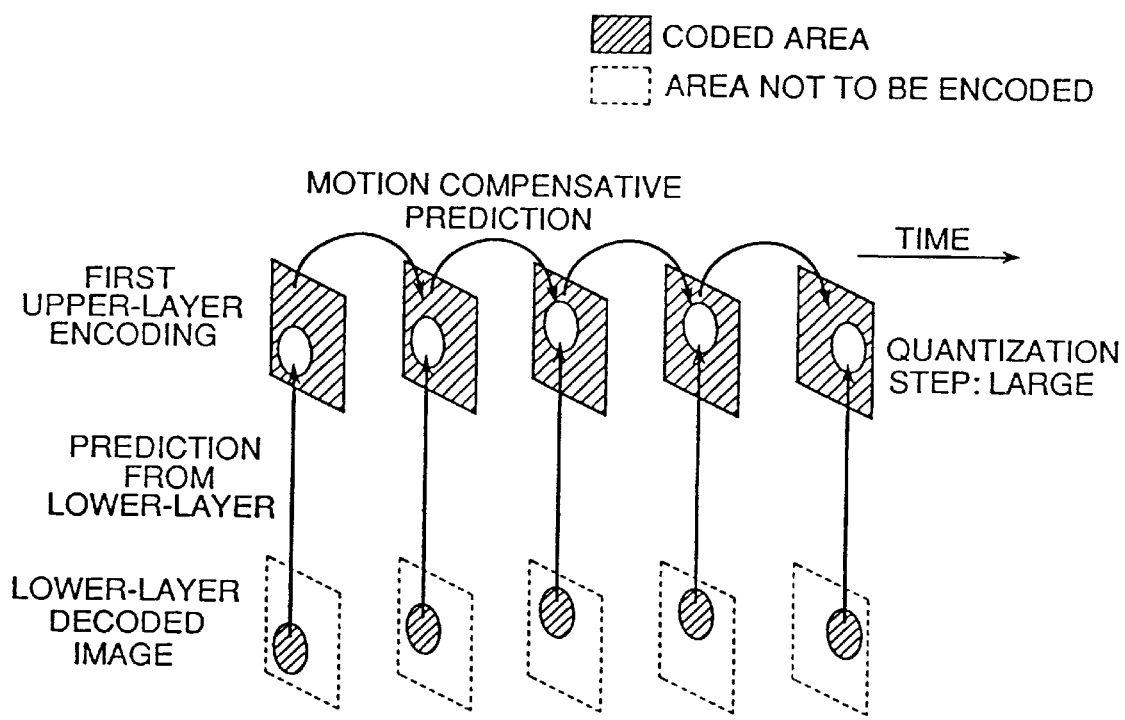
FIG. 7 shows another exemplified method of encoding first upper-layer coded data by a coding device according to the present invention.

There are several kinds of encoding methods which are applicable in the lower-layer coding portion 4, the first-layer coding portion 1 and the second-layer coding portion 2, which will be described as follows: FIGS. 6 and 7 are illustrative of the technique of controlling the lower-layer image-quality and the upper-layer image quality depending upon quantization steps.

FIG. 6(a) illustrates how to encode the lower-layer image data. A hatched area represents a selected area. At the lower-layer, a selected area of a first frame is intraframely encoded and selected areas of other remaining frames are predictively encoded by motion-compensative prediction method. As a reference image for the motion compensative prediction is used a selected area of a frame of the lower-layer, which has been already encoded and decoded. Although only forward prediction is shown in FIG. 6(a), it may be applied in combination with backward prediction. Because the quantization step at the lower-layer is controlled to be larger than that at the second upper layer, only a selected area of an input image is encoded to be of a lower image-quality (with a low signal-to-noise ratio). Consequently, the lower-layer image-data is encoded by using a smaller amount of codes.

FIG. 6(b) illustrates how to encode the first upper-layer image data. At this layer, a whole image is encoded. For example, a whole image is encoded by predictive coding based on a decoded image of the lower-layer and a decoded image of the first upper-layer. In this case, a whole image of the first frame is encoded by prediction from the lower-layer decoded image (areas other than selected one are intraframely encoded in practice because the motion-compensative prediction method can not be applied in practice). Other frames can be encoded by using the predictive coding in combination with the motion compensative prediction.

Such a variation is also applicable, which does not encode a selected area and encodes only other areas by the predictive coding method as shown in FIG. 6. The encoding process is performed for areas other than the selected one.

FIG. 6(c) illustrates how to encode the second upper-layer image data. Only a selected image area is encoded at a relatively small quantization step. In this case, objective data to be encoded is differential data obtained between original image data and image data predicted from the lower-layer image data. Although only prediction from the lower-layer image data is shown in FIG. 6(c), it may be used in combination with the prediction from a decoded frame of the second upper-layer.

Figure 8:
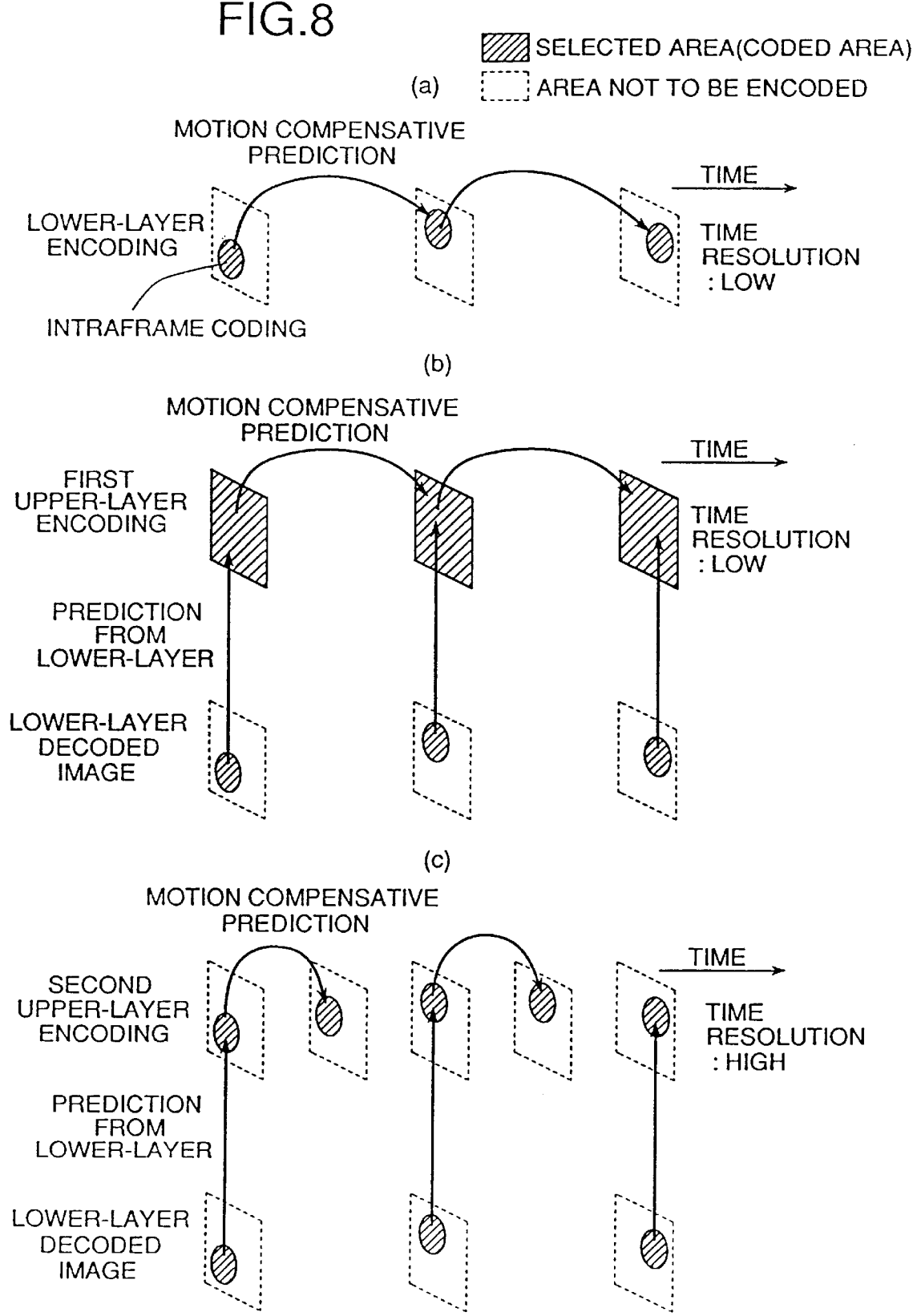
FIG. 8 shows another exemplified method of encoding lower-layer, first upper-layer and second upper-layer coded data by a coding device according to the present invention.

FIG. 8 is a view for explaining a method of controlling the lower-layer image quality and the upper-layer image quality by using differential time resolution values.

FIG. 8(a) illustrates how to encode the lower-layer image data. A hatched area represents a selected area. At the lower-layer, a selected area of a first frame is intraframely encoded and selected areas of other remaining frames are predictively encoded by motion-compensative prediction. As a reference image for the motion compensative prediction is used a selected area of a frame of the lower-layer, which has been already encoded and decoded. Although only forward prediction is shown in FIG. 8(a), it may be applied in combination with backward prediction. The frame-rate of the lower-layer is so decreased that time resolution is adjusted to be lower than that at the second upper layer. It is also possible to encode frames at a smaller quantization interval so that each frame may have a larger signal-to-noise ratio.

FIG. 8(b) illustrates how to encode the first upper-layer image data. A whole image is encoded with a low time-image-resolution. In this case, it is possible to apply the coding method similar to that shown in FIG. 6(b) or FIG. 7.

FIG. 8(c) illustrates how to encode the second upper-layer image data. Only a selected area is encoded with a higher time resolution. In this case, a frame whose selected area was encoded at the lower-layer is encoded by prediction from the lower-layer decoded image, whereas all other frames are encoded by motion compensative prediction from the already decoded frames of the upper-layer. In case of using prediction from the lower-layer decoded frame, it is possible not to encode any second upper-layer image data, adopting the lower-layer decoded image as a second upper-layer decoded image.

Figure 9:
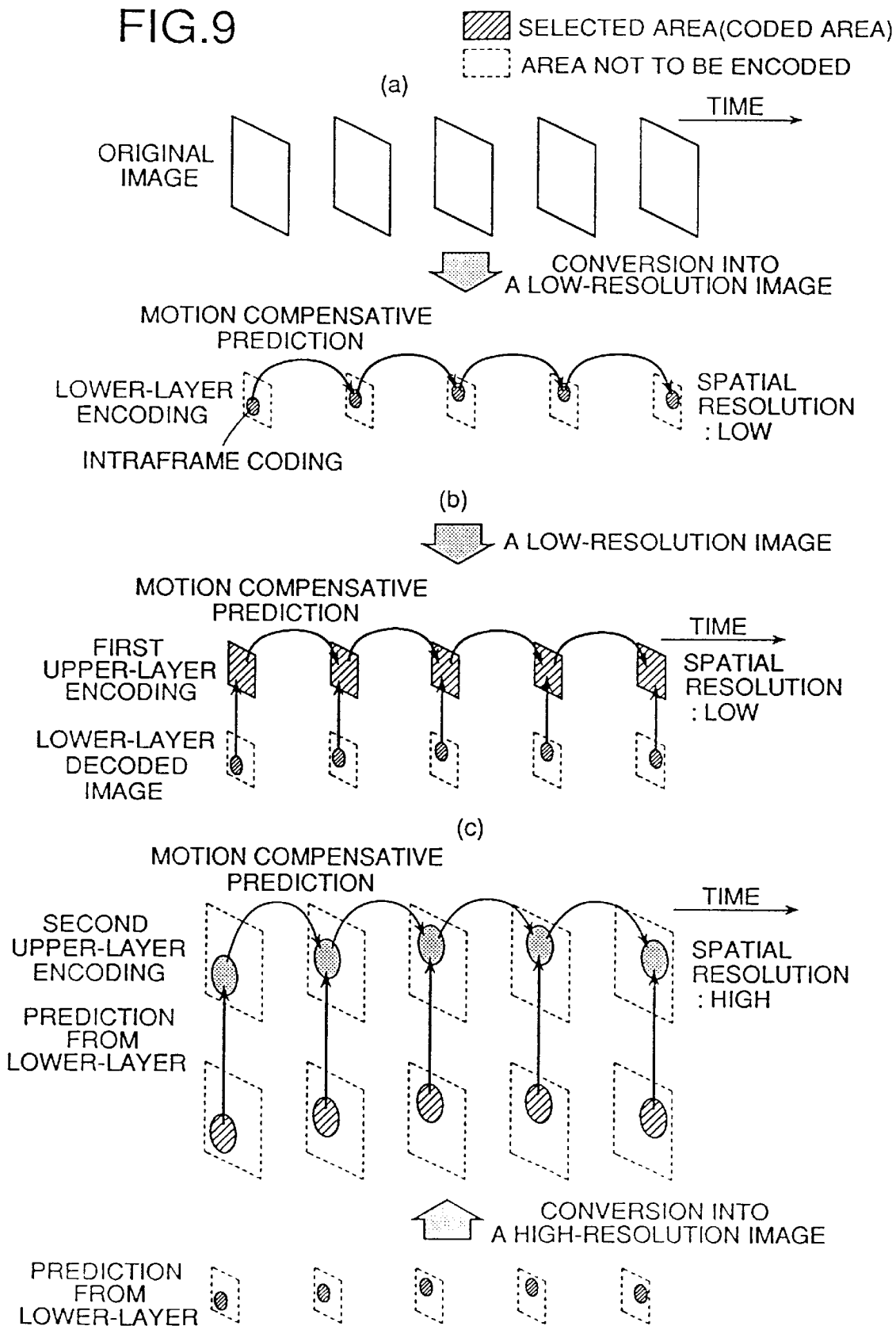
FIG. 9 shows another exemplified method of encoding lower-layer, first upper-layer and second upper-layer coded data by a coding device according to the present invention.

FIG. 9 is a view for explaining a method of the lower-layer image quality and the upper-layer image quality by using differential spatial resolution values.

FIG. 9(a) illustrates how to encode the lower-layer image data. An original image is converted into an image of a lower spatial resolution through a low-pass filter or thinning operation. Only hatched selected areas are encoded. At the lower-layer, a selected area of a first frame is intraframely encoded and selected areas of other remaining frames are predictively encoded by motion-compensative prediction.

FIG. 9(b) illustrates how to encode the first upper-layer image data. An original image is converted into an image of a lower spatial resolution and a whole image is encoded with a higher time-resolution. In this case, it is possible to apply the coding method similar to that shown in FIG. 6(b) or FIG. 7.

FIG. 9(c) illustrates how to encode the second upper-layer image data. Only a selected area is encoded with a higher spatial resolution. In this case, a decoded image of the lower-layer is converted into an image having the same spatial resolution as an original image and selected areas are encoded by prediction from the lower-layer decoded image and by motion compensative prediction from the already decoded frame of the second upper-layer.

The above-described image-quality controlling methods using gradation resolution (by Signal-Noise-Ratio), time resolution and spatial resolution may be also applied in combination with one another.

For example, it is possible to adjust the lower-layer image-quality and the upper-layer image quality by using a combination of a differential spatial resolution and a differential time resolution or by using a combination of a differential quantization step and a differential time resolution.

A selected area in a whole image is thus encoded to have a higher image-quality than that of other areas. At the same time, the coded data is given respective one of three hierarchical layers (two upper layers and one lower-layer).

Figure 10:
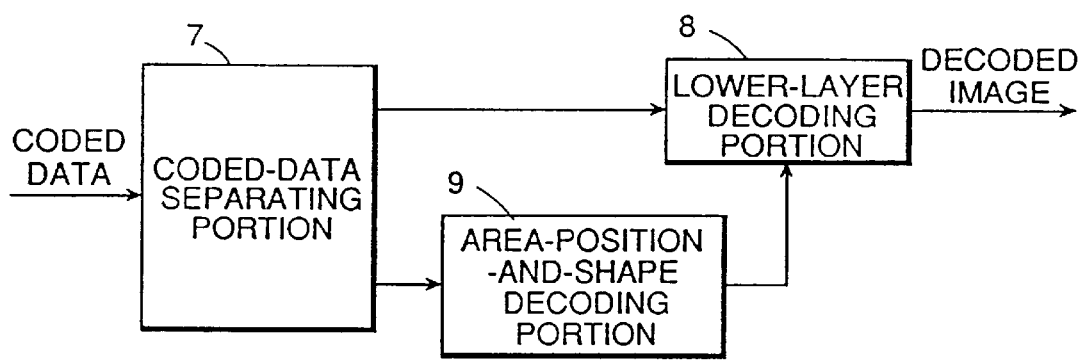
FIG. 10 is a block diagram showing a decoding device representing an embodiment of the present invention.

Decoding devices which are preferred embodiments of the present invention will be described as follows:

FIG. 10 is illustrative of a first embodiment of a decoding device according to the present invention, which is intended to decode only lower-layer image data.

In FIG. 10, a coded data separating portion 7 is intended to separate coded data into area-position-and-shape coded data and lower-layer coded image data and selectively extract desired coded data.

An area-position-and-shape decoding portion 9 is intended to decode a position code and a shape code of a selected area.

An lower-layer decoding portion 8 is intended to decode lower-layer coded data of a selected area and to prepare a lower-quality decoded image of the selected area only.

Accordingly, each image outputted from this decoding device relates to image information of a selected area only, which is indicated as a window on a display screen. The lower-layer decoding portion 8 may be provided with a spatial resolution converter to enlarge the select area to full screen size and indicate it on the display screen.

The shown embodiment may obtain decoded images of a lower quality because of decoding only lower-layer data of a selected area, but it may be simple in hardware construction omitting an upper-layer decoding portion and may easily decode the coded image by processing an decreased amount of the coded data.

Figure 11:
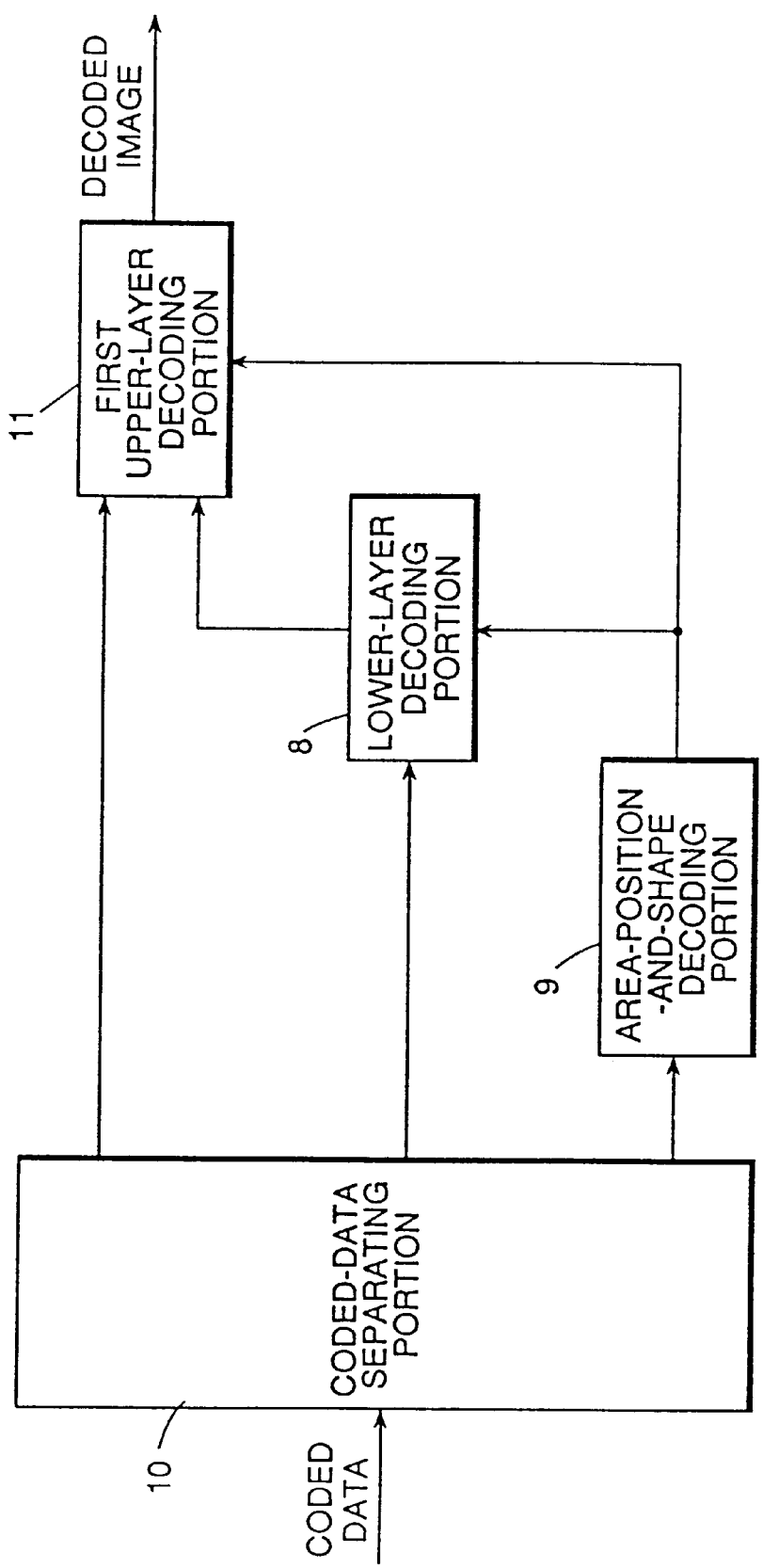
FIG. 11 is a block diagram showing a decoding device representing another embodiment of the present invention.

FIG. 11 is illustrative of a second embodiment of a decoding device according to the present invention, wherein an area-position-and-shape decoding portion 9 and an lower-layer decoding portion 8 are similar in function to those of the first embodiment.

In FIG. 11, a coded data separating portion 10 separately extracts, from coded data, area-position-and-shape coded data, lower-layer coded data of an area and first upper-layer coded data.

A first upper-layer decoding portion 11 decodes a first upper-layer coded data, whereby a whole image is decoded to be of a lower quality by using area-position-and-shape data, the lower-layer decoded image and the second upper-layer decoded image. A first upper-layer decoded image is thus prepared.

Although the shown embodiment uses the first upper-layer coded data, it may also use the second upper-layer instead of the first upper-layer. In this case, the coded data separating portion 10 separately extracts, from coded data, area-position-and-shape coded data, lower-layer coded data of an area and second upper-layer coded data. The first upper-layer decoding portion 11 is replaced by a second upper-layer decoding portion which decodes a second upper-layer coded data by using the area-position-and-shape data, the lower-layer decoded image and the second upper-layer decoded image and only the selected image is decoded to be of a higher quality. A second upper-layer decoded image thus prepared may be displayed as a window on a display screen or be enlarged to full-screen size and then displayed thereon.

Figure 12:
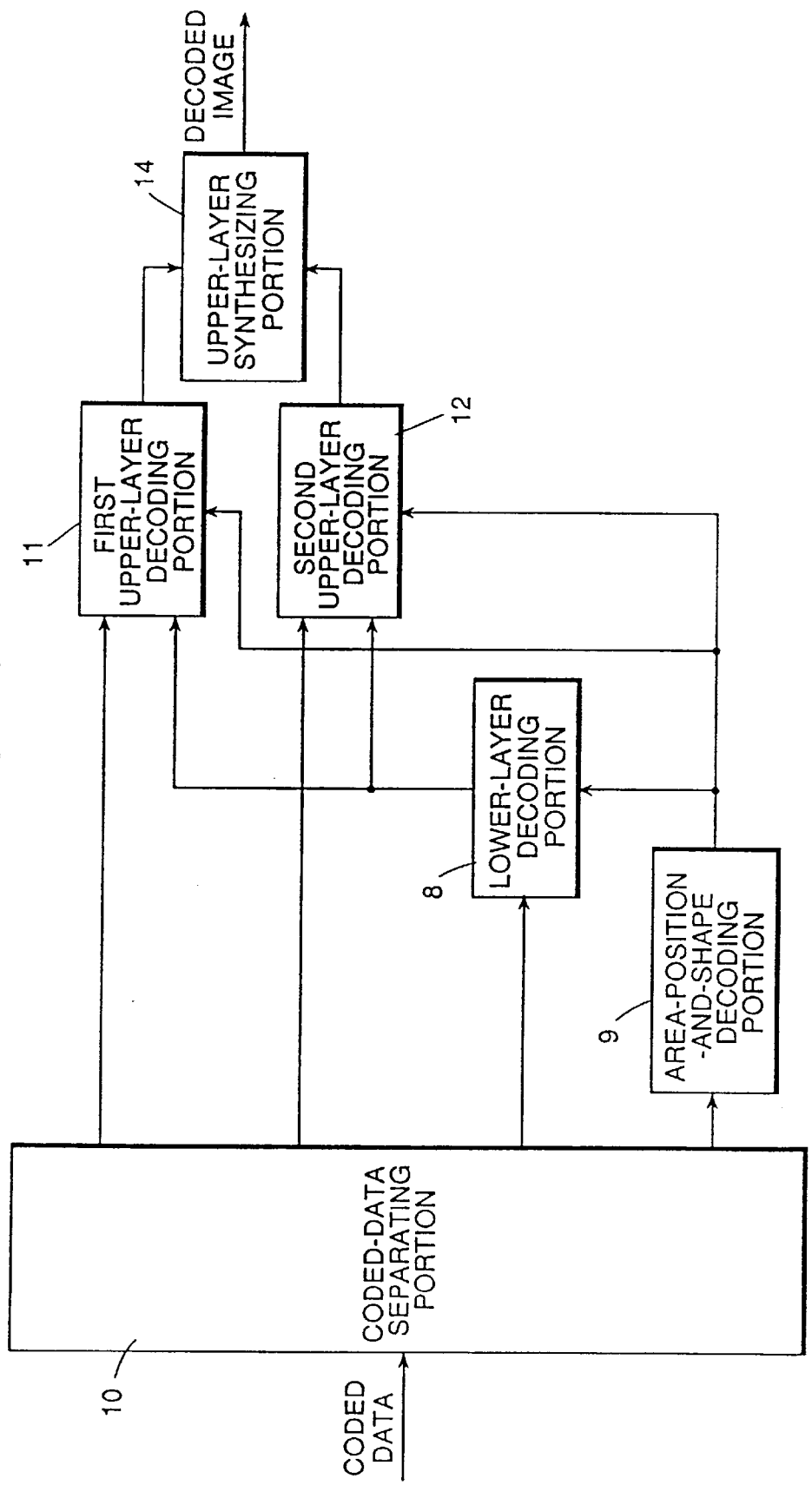
FIG. 12 is a block diagram showing a decoding device representing another embodiment of the present invention.

FIG. 12 is illustrative of a third embodiment of a decoding device according to the present invention, wherein an area-position-and-shape decoding portion 9 and an lower-layer decoding portion 8 are similar in function to those shown in FIG. 2.

In FIG. 12, a coded data separating portion 10 separately extracts, from coded data, area-position-and-shape data, lower-layer coded data, first upper-layer coded data and second upper-layer coded data.

A first upper-layer decoding portion 11 decodes a first upper-layer coded data, while a second upper-layer decoding portion 13 decodes a second upper-layer coded data.

An upper-layer synthesizing portion 14 combines a second upper-layer decoded image with a first upper-layer decoded image to produce a synthesized image by using information on the area position and shape. The synthesis of a selected area is conducted by using the second upper-layer decoded image, while the synthesis of other areas is conducted by using the first upper-layer decoded image. Therefore, an image outputted from the decoding device relates to a whole image wherein a selected area is particularly decoded to be of a higher quality as to parameters such as SNR (Signal-to-Noise Ratio), time resolution and spatial resolution. An area selected by the coding device is thus decoded to have a higher quality than that of other areas.

Figure 13:
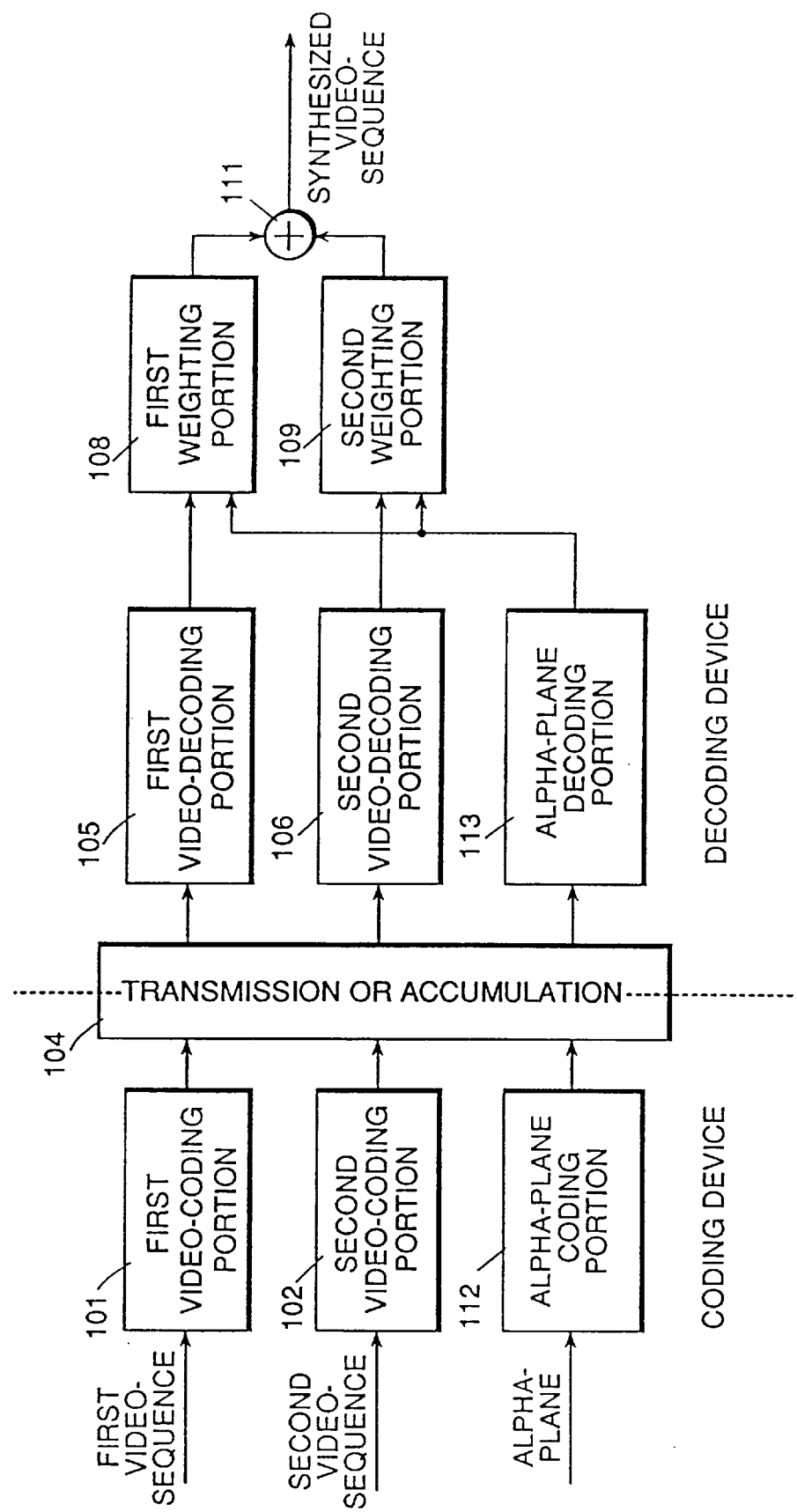
FIG. 13 is a block diagram for explaining a conventional method.
Figures 14, 16:
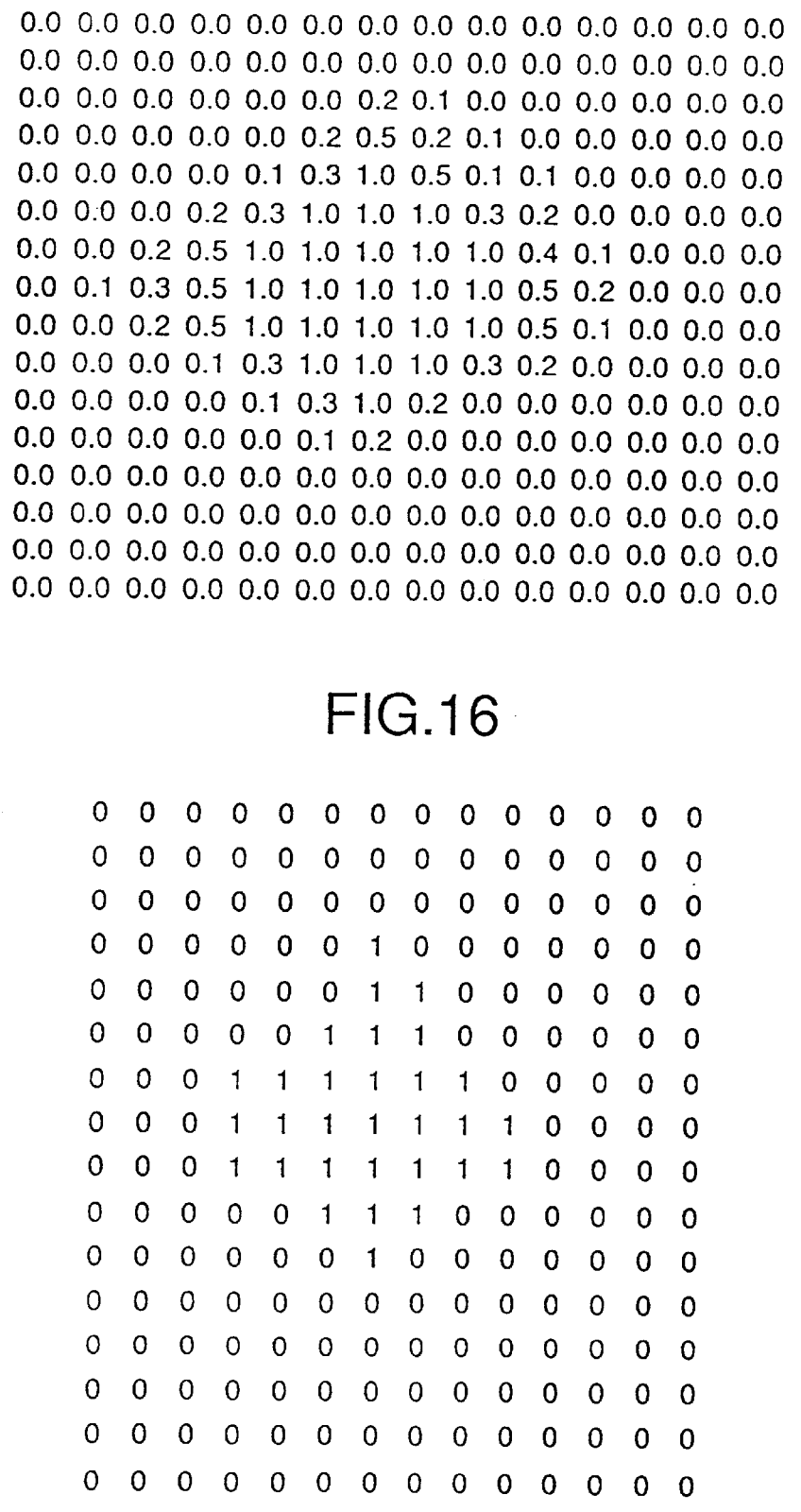

FIG. 13 is a block diagram showing a conventional device as a reference to the present invention. A first video-sequence is assumed to be a background video and a second video-sequence is assumed to be a part video. An alpha plane is weight data used when synthesizing a part image with a background image in a moving picture (video) sequence. FIG. 14 shows an exemplified image made of pixels weighted with values of 1 to 0. The alpha-plane data is assumed to be 1 within a part and 0 out of a part. The alpha data may have a value of 0 to 1 in a boundary portion between a part and the outside thereof in order to indicate a mixed state of pixel values in the boundary portion and transparency of transparent substance such as glass.

Referring to FIG. 13 showing the conventional method, a first video-coding portion 101 encodes the first video-sequence and a second video-coding portion 102 encodes the second video-sequence according to an international standard video-coding system, e.g., MPEG or H.261. An alpha-plane coding portion 112 encodes an alpha-plane. In the above-mentioned paper, this portion uses the techniques of vector quantization and Haar transformation. A coded-data integrating portion (not shown) integrates coded data received from the coding portions and accumulates or transmits the integrated coded data.

In the decoding device of the conventional method, a coded-data dissembling portion (not shown) disassembles coded data into the coded data of the first video-sequence, the coded data of the second video-sequence and the coded data of the alpha-plane, which are then decoded respectively by a first video-decoding portion 105, a second video-decoding portion 106 and an alpha-plane decoding portion 113. Two decoded sequences are synthesized according to weighted mean values by a first weighting portion 108, a second weighting portion 109 and adder 111. The first video-sequence and the second video-sequence are combined according to the following equation:

$$f(x,y,t)=(1-\alpha(x,y,t))f1(x,y,t)+\alpha(x,y,t)f2(x,y,t)$$

In the equation, (x,y) represents coordinate data of an intraframe pixel position, t denotes a frame time, f1(x,y,t) represents a pixel value of the first video sequence, f2(x,y,t) represents a pixel value of the second video sequence, f(x,y,t) represents a pixel value of the synthesized video sequence and α(x,y,t) represents alpha-plane data. Namely, the first weighting portion 108 uses 1−α(x,y,t) as a weight while the second weighting portion 109 uses α(x,y,t) as a weight.

As mentioned above, the conventional method produces a large number of coded data because it must encode alpha-plane data.

To avoid this problem, saving the information amount by binarizing alpha-plane data may be considered, but it is accompanied by such a visual defect that tooth-like line appears at the boundary between a part image and a background as the result of discontinuous change of pixel values thereabout.

FIG. 15 is a block diagram showing a coding device and decoding device embodying the present invention. In FIG. 15, a first video-coding portion 101, a second video-coding portion 102, a first video-decoding portion 105, a second video-decoding portion 106, a first weighting portion 108, a second weighting portion 109 and adder 111 are similar in function to those of the conventional device and, therefore, will not be further explained. In FIG. 15, an area-information coding portion 103 encodes an area information representing a shape of a part image of a second video-sequence, an area-information decoding portion 107 decodes the coded area-information and an alpha-plane generating portion 110 prepares an alpha plane by using coded area information.

The operations of the coding device and the decoding device are as follows:

The coding device encodes the first video-sequence and the second video-sequence by the first video-coding portion 101 and the second video-coding portion 102 respectively and encodes an area information by the area-information coding portion 103 according to a method to be described later. These coded data are integrated for further transmission or accumulation by a coded-data integrating portion (not shown). On the other hand, the decoding device separates the transmitted or accumulated coded data by the coded-data separating portion (not shown) and decodes the separated coded data by the first video-decoding portion 105, the second video-decoding portion 106 and the area-information decoding portion 107 respectively. The alpha-plane generating portion 110 prepares an alpha-plane from the decoded area-information by a method to be described later. The first weighting portion 108, the second weighting portion 109 and the adder 111 may synthesize two decoded sequences by using weighted mean values according to the prepared alpha-plane.

FIG. 16 shows an example of area information that corresponds to an area information of a part video-image of FIG. 14. The area information is binarized using a threshold of 0.2. Area information may be thus obtained by binarizing the alpha plane or it may be determined by edge detection or other area-dividing method. In case of selecting an area by a method described in a reference material "Real-time face-image following-up method" (The Institute of Image Electronics Engineers of Japan, Previewing Report of Society Meeting, 93-04-04, pp. 13–16, 1993), information to be used may be a rectangle. In this instance, area information is binarized, e.g., as 1 within a body and as 0 outside the body.

A practical technique of encoding area information, which will not be explained in detail, may be run-length coding and chain coding since the area information is binarized data. If area data represents a rectangle, it requires encoding only coordinate data of its start point, length and width.

Various kinds of methods may be applied for preparing an alpha-plane depending upon what shape area-information represents.

In case of an area having a rectangular shape, an alpha-plane can be prepared by independently using the following linear weight-values in horizontal direction and vertical direction of the rectangle area.

$$W_{N,a}(x) = \begin{cases} \sin^2[(x+1/2)\pi/L] & (0 < x \leq L/2) \\ 1 & (L/2 < x \leq N-L/2) \\ \sin^2[((x-M)+1/2)\pi/L] & (N-L/2 < x \leq N) \end{cases} \quad (1)$$

Figure 17:
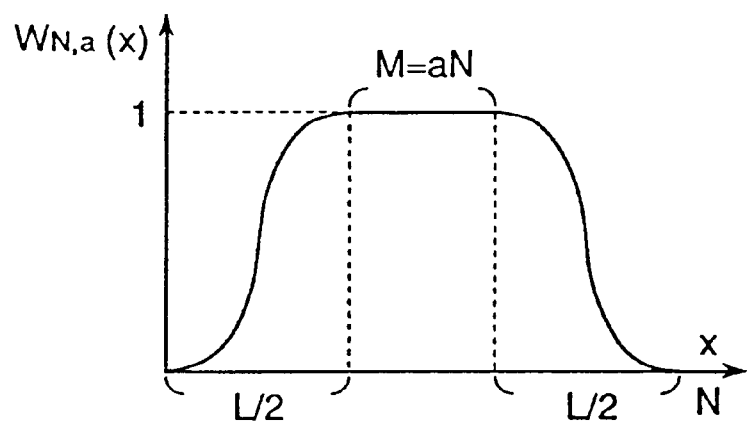
FIG. 17 shows an example of a linear weight function according to the present invention.

In the equation (1), M is equal to "aN" and L is equal to "N−M" ("a" is a real value of 0 to 1). "N" represents a size of a rectangle area and "a" represents flatness of weight to be applied to said area. FIG. 17 shows an example of a linear function of weight. An alpha-plane corresponding to a rectangle is expressed as follows:

$$\alpha(x,y)=WNx,ax(x)WNy,ay(y) \quad (2)$$

In the equation (2), a size of the rectangle is expressed by the number of pixels "Nx" in horizontal direction and pixels "Ny" in vertical direction and the flatness of weight is expressed by "ax" in horizontal direction and by "ay" in vertical direction.

Various combinations of linear weight functions other than the equation (1) may be also considered to use.

Three different methods for preparing an alpha-plane for an area of any desired shape, by way of example, will be described as follows:

The first method is to determine a circumscribed rectangle of the area and then to apply the above-mentioned linear weight functions to the circumscribed rectangle in horizontal direction and vertical direction respectively.

Figure 18:
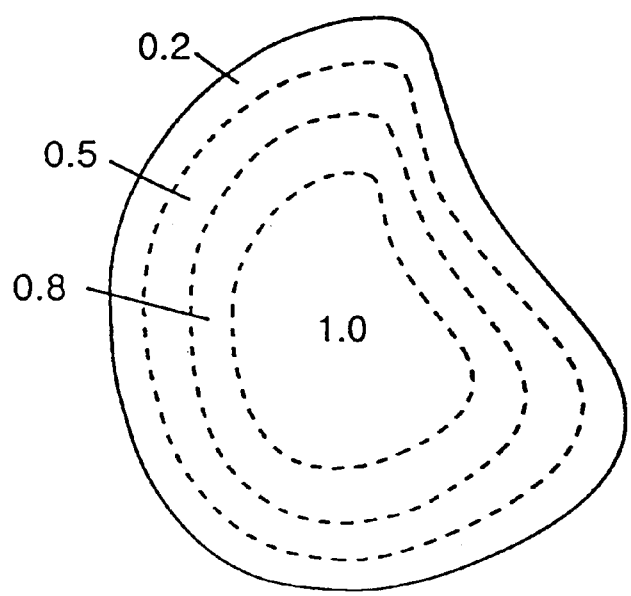
FIG. 18 shows an example of preparing an alpha-plane according to the present invention.

The second method is to sequentially determine weight values to be applied to an area from its circumference as shown in FIG. 18. For example, pixels at the circumference of the area are determined and are given a weight of 0.2 respectively. Next, pixels at the circumference of a still-not-weighted part within the area are determined and are given a weight of 0.5 respectively. These operations are repeated until circumferential pixels are weighted at 1. Preparation of an alpha-plane is finished by applying a weight of 1.0 to a last not-weighted area. The obtained alpha-plane has a value of 1.0 at its center portion and a value of 0.2 at its circumferential portion. In case of determining weight values from circumference of an area, it is possible to use a linear weight function of the equation (1) or other linearly varying values. In sequentially changing a weight-value, a circumferential pixel thickness may be a single pixel or more.

The third method is to apply a weight of 0 to the outside of an area and a weight of 1 to the inside of the area and then to process a thus binarized image through a low-pass filter to gradate the area boundary portion. Various kinds of alpha-planes can be prepared by changing a size and coefficient of a filter and the number of filtering operations.

As is apparent from the foregoing, the first embodiment can attain an increased efficiency of data coding in comparison with the conventional device because the alpha-plane is prepared by the decoding side, thereby eliminating the need of encoding weight-information. In addition, the decoding device prepares an alpha-plane from the decoded area information and synthesizes video-sequences by using the prepared alpha-plane, thereby preventing the occurrence of such a visual defect that a toothed line appears at the boundary of a part image in the background.

Figure 19:
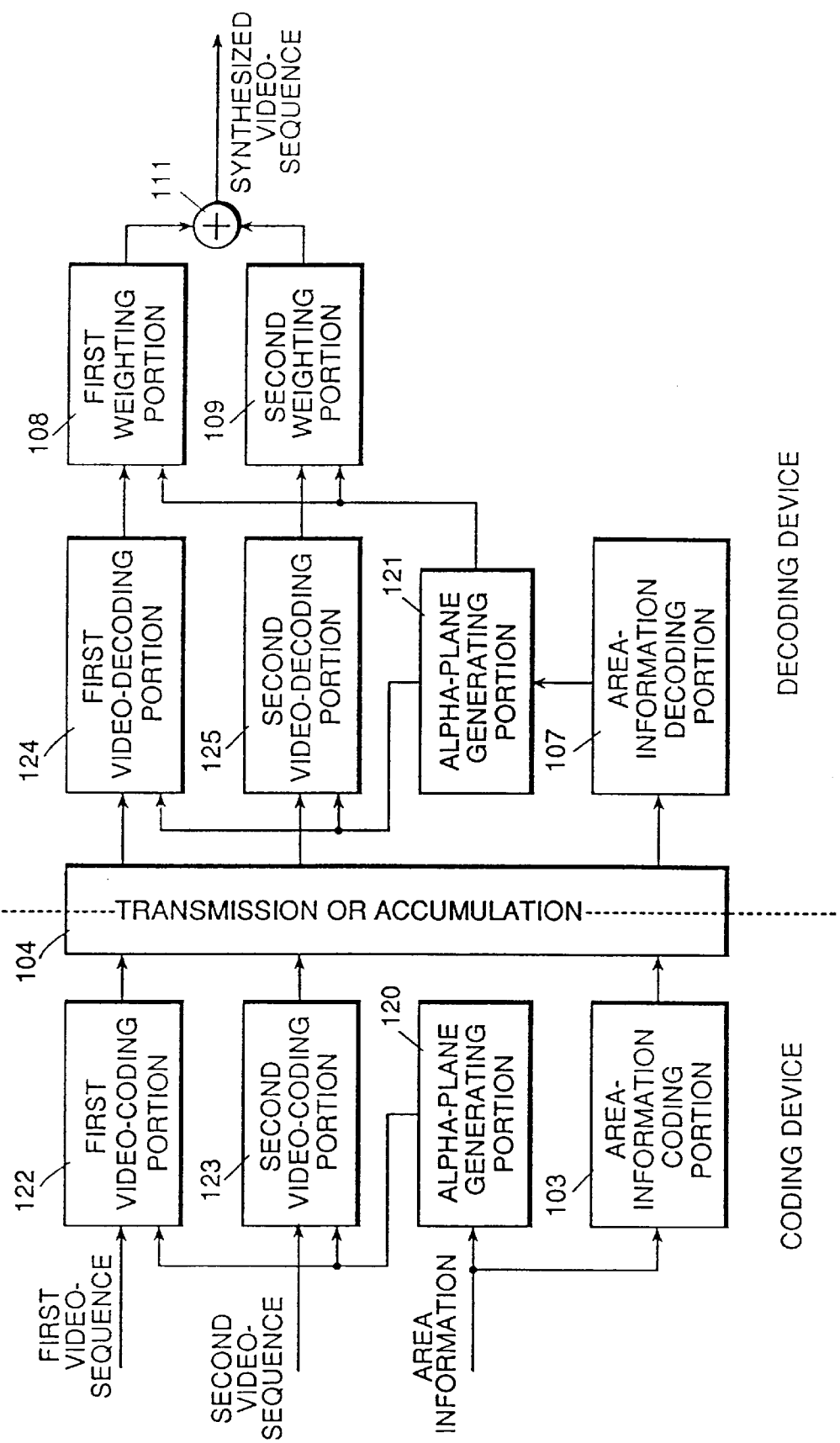
FIG. 19 is a block diagram for explaining another embodiment of the present invention.

Another embodiment of the present invention will be described as follows:

FIG. 19 is a block diagram showing a coding device and a decoding device of the embodiment. In FIG. 19, a first weighting portion 108, a second weighting portion 109 and adder 111 are similar to those of the conventional device and is omitted from the further explanation. An area-information coding portion 103, an area-information decoding portion 107, alpha-plane generating portions 121 and 122 are similar in function to those of the first embodiment and, therefore, will not be further explained.

This embodiment is featured in that the coding side is also provided with an alpha-plane generating portion 120 for encoding an image with weight values for synthesizing a plurality of video sequences. Coded data becomes smaller than the original data because weight data is not more than 1, and, therefore, an amount of coded data can be reduced.

In FIG. 19, a first video-coding portion 122 and a second video-coding portion 123 encode images of video-sequences by weighting on the basis of respective alpha-planes prepared by the coding side. A first video-decoding portion 124 and a second video-decoding portion 125 decode the coded images of the video-sequences by inversely weighting on the basis of respective alpha-planes prepared by the decoding side.

Figure 20:
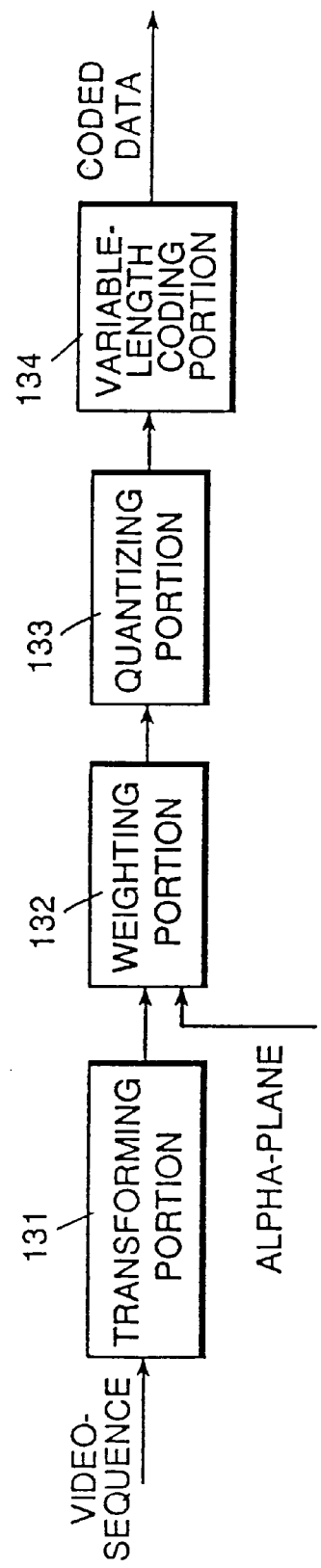
FIG. 20 is a block diagram for explaining an example of a video-coding portion in another embodiment of the present invention.

The first video-coding portion 122 or the second video coding portion 123 may be constructed for transform-coding as shown, for example, in FIG. 20. A video-sequence to be processed is the first video-sequence or the second video-sequence. A transforming portion 131 transforms an input image by block by using a transforming method such as DCT (Discrete Cosine Transform), discrete Fourier transform and Weiblet transform.

In FIG. 20, a first weighting portion 132 weights a transform-coefficient with an alpha-plane value. The value used for weighting may be a representative of an alpha-plane within an image block to be processed. For example, a mean value of the alpha-plane within the block is used. Transform-coefficients of the first video sequence and the second video sequence are expressed by g1(u,v) and g2(u,v) respectively and they are weighted according to the following equations:

$$gw1(u,v)=(1-\overline{\alpha})g1(u,v)$$
$$gw2(u,v)=\overline{\alpha}g2(u,v) \quad (3)$$

In the equation (3), gw1(u,v) and gw2(u,v) denote weighted transform coefficients, u and v denote horizontal and vertical frequencies, $\overline{\alpha}$ is a representative of an alpha-plane in a block.

In FIG. 20, a quantizing portion 133 quantizes transform coefficients, a variable-length coding portion 134 encodes the quantized transform coefficients with variable-length codes to generate coded data.

Figure 21:
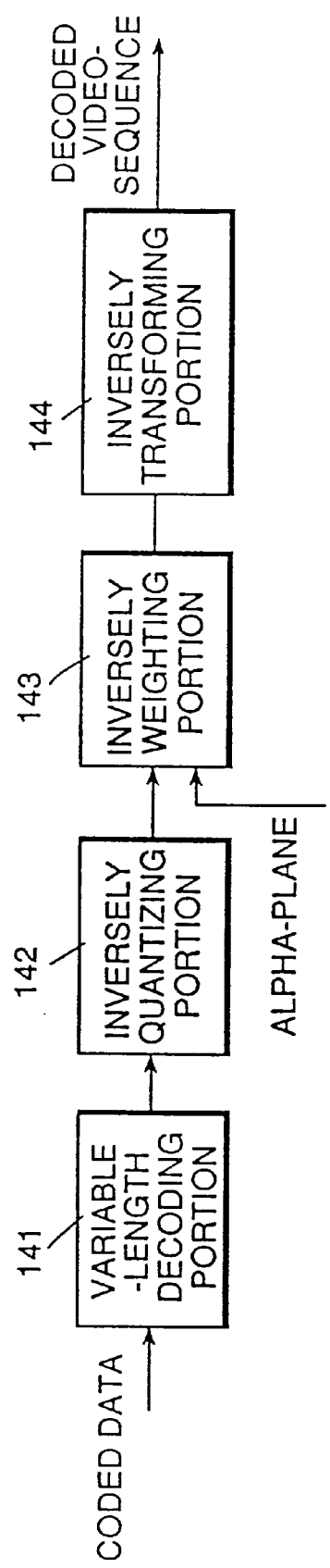
FIG. 21 is a block diagram for explaining an example of a video-decoding portion in another embodiment of the present invention.

A first video-decoding portion 124 or a second video-decoding portion 125, which corresponds to the video-coding portion of FIG. 19, may be constructed as shown in FIG. 21. A variable-length decoding portion 141 decodes coded data, an inversely quantizing portion 142 inversely quantizes decoded data and an inversely weighting portion 143 performs reverse operation on transform coefficients to reverse the equation (2). Namely, the transform coefficients are weighted with weight values that reverse those applied at the coding side according to the following equation:

$$\hat{g}1(u,v)=\hat{g}w1(u,v)/(1-\overline{\alpha})$$
$$\hat{g}2(u,v)=\hat{g}w2(u,v)/\overline{\alpha} \quad (4)$$

In the equation (4), ^ (Hat) indicates decoded data, e.g., gw1 with a hat is a weighted decoded transform coefficient of the first video-sequence.

Besides above-mentioned weighting method, there is such an applicable method that does not weight a direct current component of a transform coefficient and weights other transform coefficients according to the equation (2). In this case, weighting is substantially effected by correcting a quantizing-step width adopted by the international standard MPEG or H.261 by using a representative value of the alpha-plane within the block.

Namely, a quantizing-step width changing portion 38 is provided as shown in FIG. 21, whereby a quantizing-step width determined by a quantizing-step width determining portion (not shown) is changed by using alpha-plane data. In practice, a representative $\overline{\alpha}$ (e.g., a mean value) of the alpha-plane within a block is first determined, then the quantizing-step width is divided by a value $(1-\overline{\alpha})$ for the first video sequence or by a value $\overline{\alpha}$ for the second video-sequence to obtain a new quantizing-step width.

There are two inversely weighting methods which correspond to the above-mentioned weighting method. The first method relates to a case when a quantizing-step width (without being changed by the quantizing-step width changing portion 138) is encoded by the coding device shown in FIG. 22. In this case, the decoding device of FIG. 23, which is provided with a quantizing-step width changing portion 148 corresponding to that of the coding side of FIG. 22, decodes the quantizing-step width by a quantizing-step width decoding portion (not shown) and then changes the decoded quantizing-step width by the quantizing-step width changing portion 148 according to the alpha-plane data. The second method relates to a case when a quantizing-step width after being changed by the quantizing-step width changing portion 138 is encoded by the coding device shown in FIG. 22. In this case, the decoding device directly uses the decoded quantizing-step width and inversely quantizes it. This eliminates the use of a special inversely weighting device (i.e., the quantizing-step width changing portion 108 of FIG. 23). The second method, however, is considered to have a decreased flexibility of weighting as compared with the first method.

The above-described second embodiment uses the transform coding. Therefore, a motion compensative coding portion featuring the MPEG system or the H.261 system was omitted from FIGS. 20 to 23. This method, however, can be applied for coding system using the motion compensative prediction. In this instance, a prediction error for motion compensative prediction is inputted into a transforming portion 131 of FIG. 20.

Figure 24:
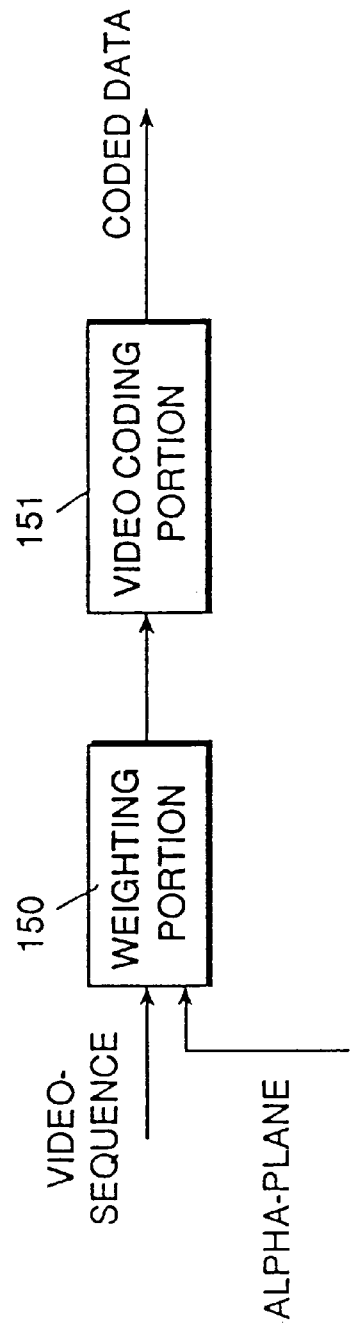
FIG. 24 is a block diagram for explaining another example of a video-coding portion in another embodiment of the present invention.

Other weighting methods in the second embodiment are as follows:

FIG. 24 shows an example of the first video-coding portion 122 or the second video-coding portion 123 of the coding device shown in FIG. 19. Namely, the coding portion is provided with a weighting portion 150 which performs weighting operation before video coding by the standard method MPEG or H.261 according to the following equation:

$$fw1(x,y)=(1-\bar{\alpha})f1(x,y)$$

$$fw2(x,y)=\bar{\alpha}f2(x,y) \quad (5)$$

In the equation (5), fw1(x,y) is the first weighted video-sequence, fw2(x,y) is the second weighted video-sequence and $\bar{\alpha}$ is a representative of an alpha-plane within a block.

Weighting may be effected according to the following equation:

$$fw1(x,y)=(1-\alpha(x,y))f1(x,y)$$

$$fw2(x,y)=\alpha(x,y)f2(x,y) \quad (6)$$

Figure 25:
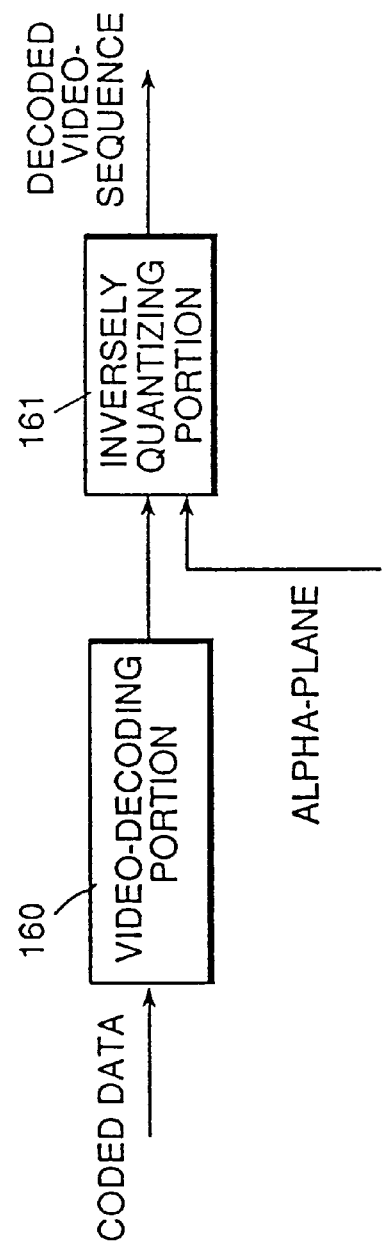
FIG. 25 is a block diagram for explaining another example of a video-decoding portion in another embodiment of the present invention.

FIG. 25 shows an inversely weighting method of the decoding device, which corresponds to the above-mentioned weighting method. The inversely weighting portion 161 weights the video-sequence with weight reversing that applied by the coding device.

Figure 26:
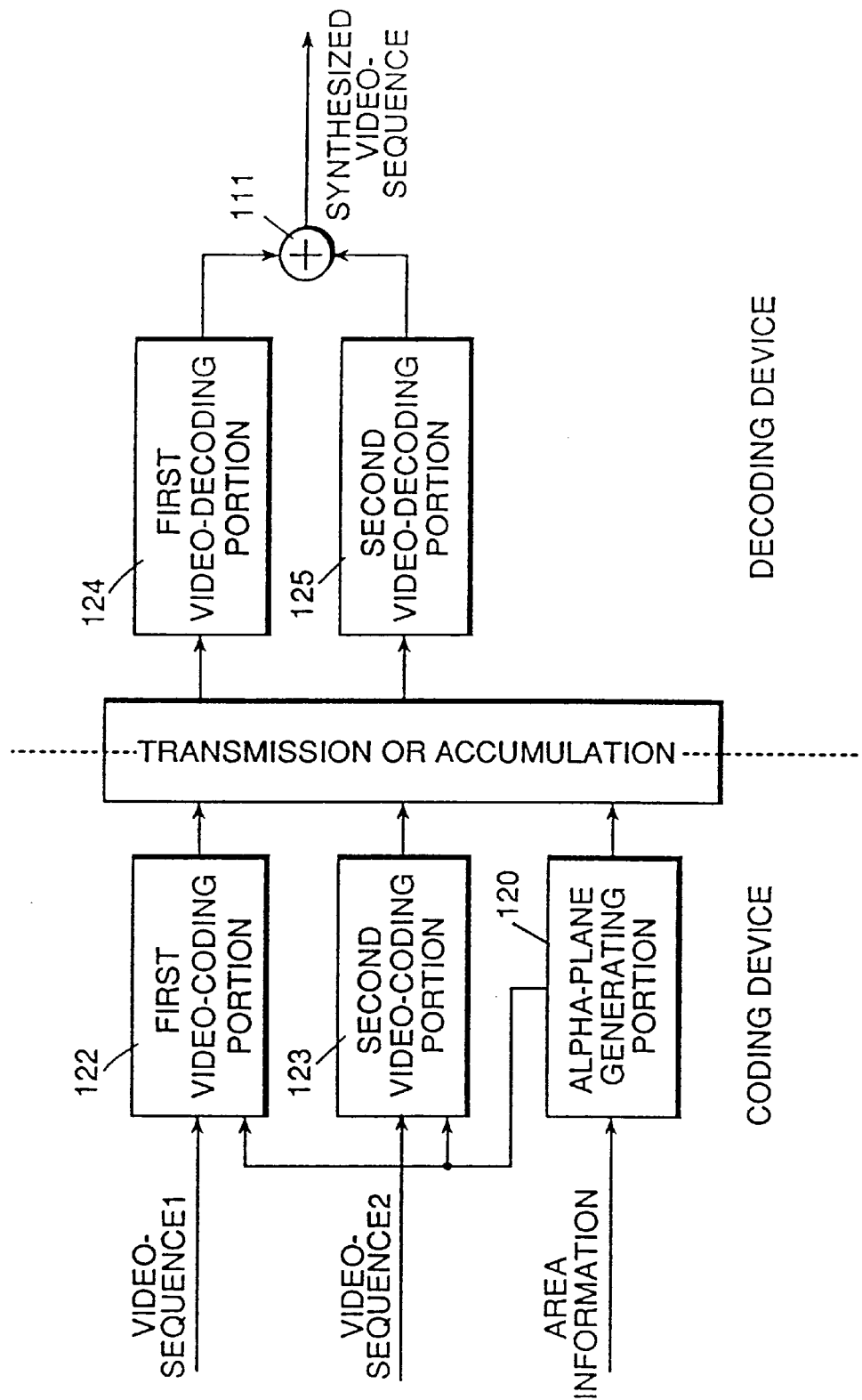
FIG. 26 is a block diagram for explaining an exemplified case that an area information is not encoded in another embodiment of the present invention.

When the coding device weighted the video-sequence according to the equation (5), the decoding device may omit the inversely weighting portion 61, the first weighting portion 108 and the second weighting portion 109 for synthesizing sequences, which are shown in FIG. 19. Namely, it is possible to use a coding device and decoding device, which are shown in FIG. 26. A first video-coding portion 122 and a second video-coding portion 123, which are shown in FIG. 26, are constructed as shown in FIG. 24, and use the weighting method of equation (5). In this instance, weight information such as area information and alpha-plane data, which are necessary for synthesizing the video-sequences, is included in the video coded data itself, the weighting information does not require encoding. Accordingly, sequences decoded by the decoding device can be directly added to each other to generate a synthesized sequence. Encoding only data within an area is rather effective than encoding a whole image if a video-sequence 102 relates to a part image. In this case, it becomes necessary to encode the area information by the coding device and to decode the coded area information by the decoding device.

The foregoing description relates to an example of weighting each of plural video-sequences in the second embodiment of the present invention. For example, the first video-sequence is weighted with a value of $(1-\bar{\alpha})$ while the second video-sequence is weighted with a value of $\bar{\alpha}$.

Although the embodiments have been explained in case of synthesizing one background video-sequence and one part vide-sequence, the present invention is not be limited thereto but can be adapted to synthesize plurality of part video-sequences with a background. In this instance, each area information corresponding to each part image is encoded.

The background image and part images may be independently encoded or may be hierarchically encoded, considering the background image as an lower-layer and the part images as upper-layers. In the latter case, each upper-layer image can be effectively encoded by predicting its pixel value from that of the lower-layer image.

There has been studied a video coding method that is adapted to synthesize different kinds of video sequences.

Following description shows conventional devices as reference to the present invention.

A paper "Image coding using hierarchical representation and multiple templates" appeared in Technical Report of IEICE IE94-159, pp. 99–106, 1995, describes such an image synthesizing method that combines a video-sequence being a background video and a part-video-sequence being a foreground video (e.g., a figure image or a fish image cut-out by using the chromakey technique) to produce a new sequence.

Figure 27:
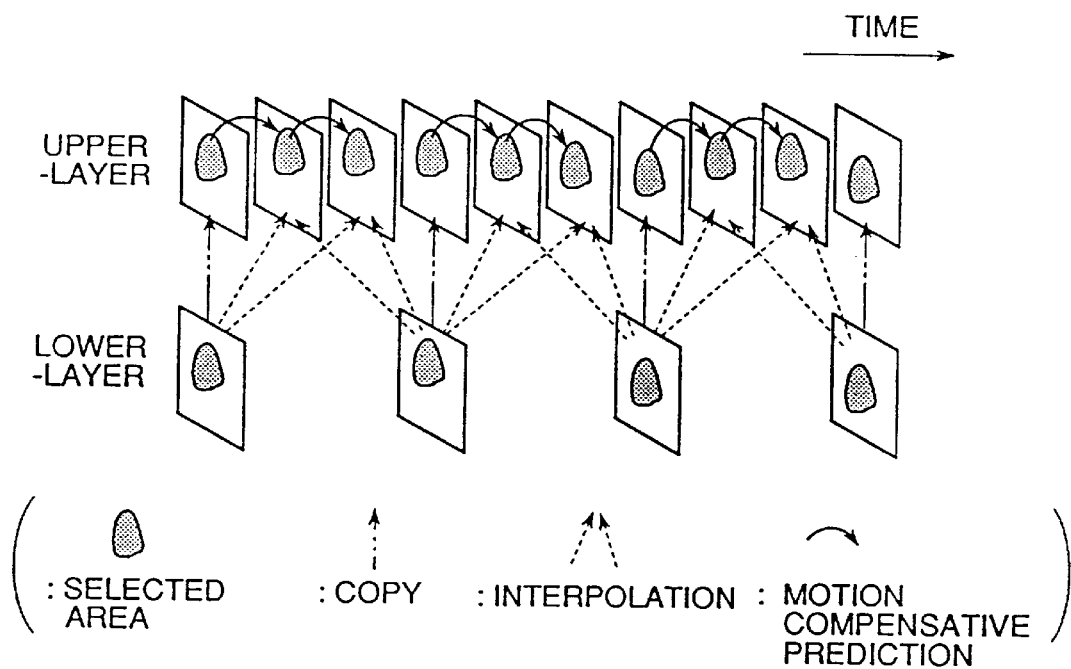
FIG. 27 shows a concept of a conventional method.

A paper "Temporal Scalability based on image content" (ISO/IEC JTC1/SC29/WG11 MPEG95/211, (1995)) describes a technique for preparing a new video-sequence by synthesizing a part-video sequence of a high frame rate with a video-sequence of a low frame rate. As shown in FIG. 27, this system is to encode an lower-layer frame at a low frame-rate by prediction coding method and to encode only a selected area (hatched part) of an upper-layer frame at a high frame rate by prediction coding. The upper layer does not encode a frame coded at the lower-layer and uses a copy of the decoded image of the lower-layer. The selected area may be considered to be a remarkable part of image, e.g., a human figure.

Figure 28:
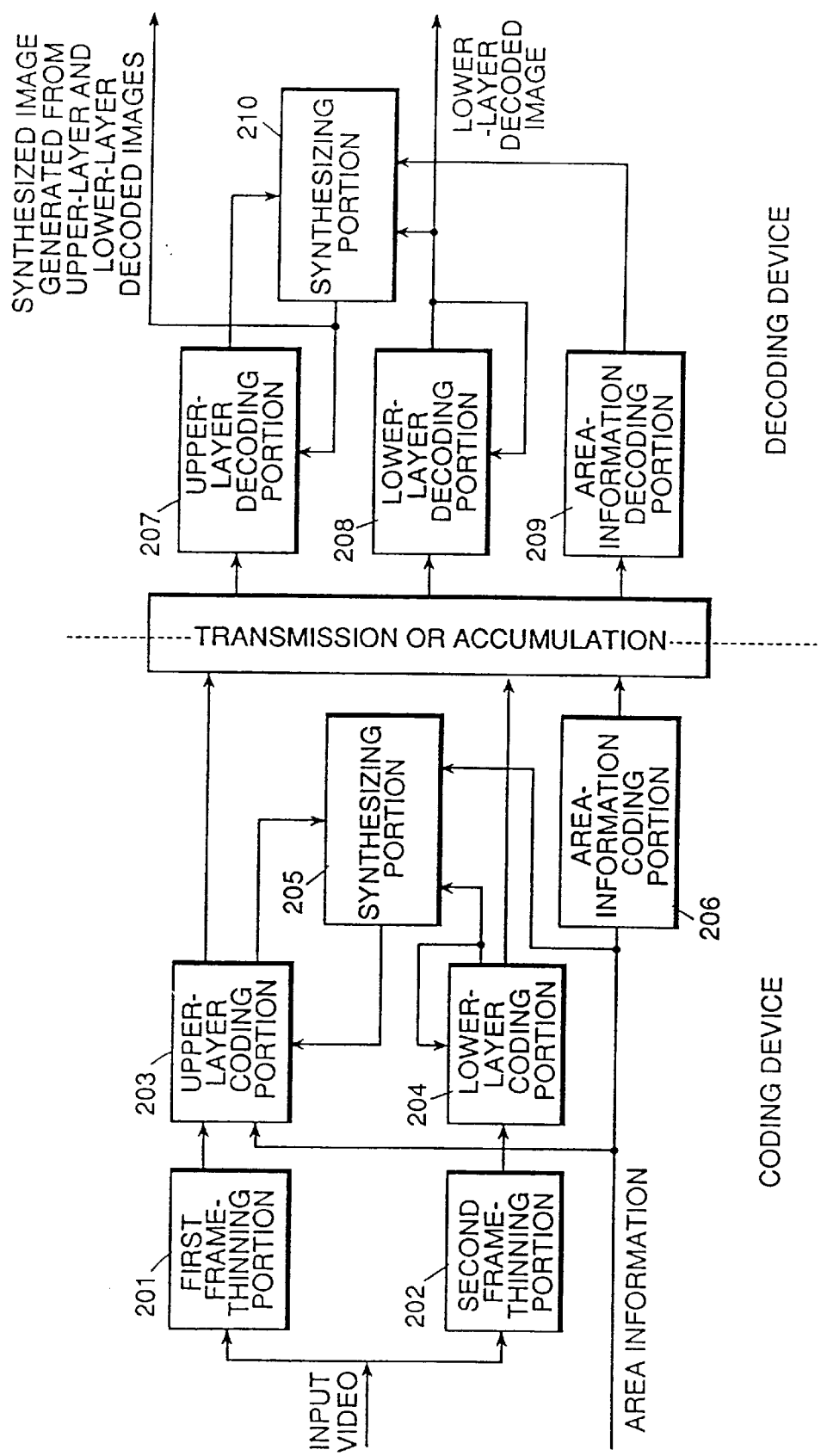
FIG. 28 is a block diagram for explaining a conventional coding and decoding system.

FIG. 28 is a block diagram showing a conventional method, at the coding side, an input video-sequence is thinned by a first thinning portion 201 and a second thinning portion 202 and the thinned video-sequence with a reduced frame rate is then transferred to an upper-layer coding portion and an lower-layer coding portion respectively. The upper-layer coding portion has a frame rate higher than that of the lower-layer coding portion.

The lower-layer coding portion 204 encodes a whole image of each frame in the received video-sequence by using an international standard video-coding method such as MPEG, H.261 and so on. The lower-layer coding portion 204 also prepares decoded frames which are used for prediction coding and, at the same time, are inputted into a synthesizing portion 205.

Figure 29:
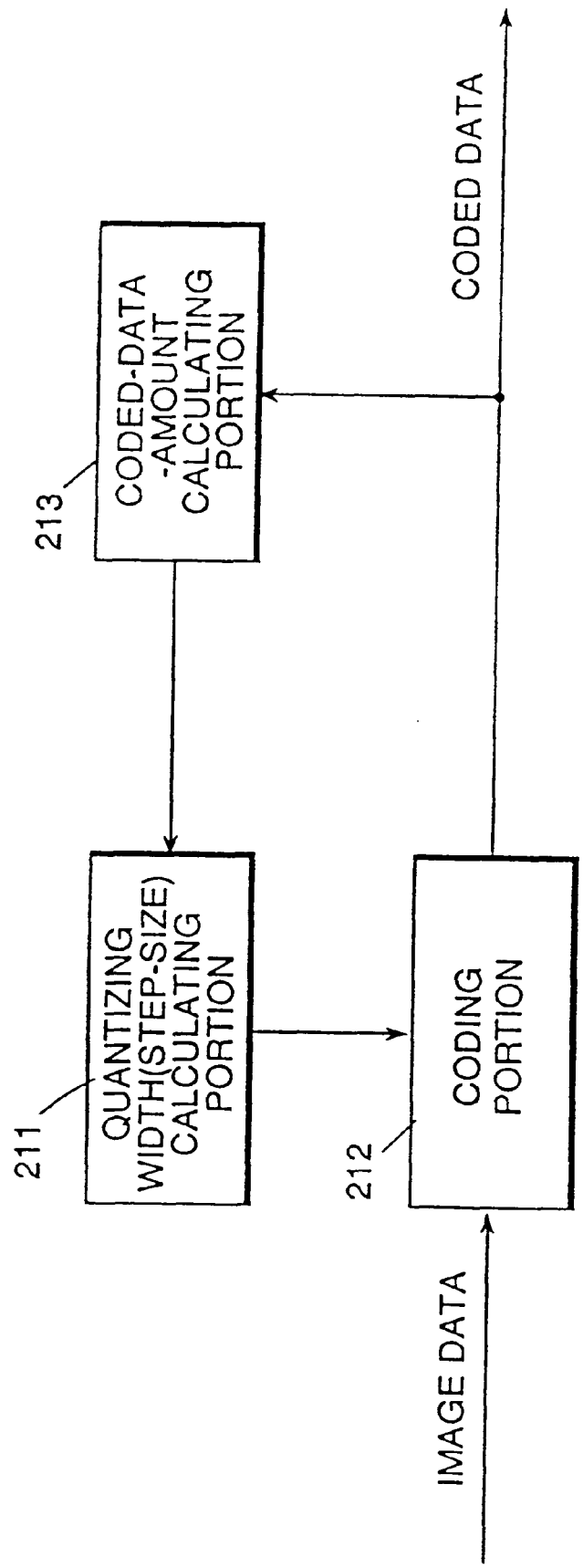
FIG. 29 is a block diagram for explaining a conventional method for controlling the number of codes.

FIG. 29 is a block diagram of a code-amount control portion of a conventional coding portion. In FIG. 29, a coding portion 212 encodes video frames by using a method or a combination of methods such as motion compensative prediction, orthogonal transformation, quantization, variable length coding and so on. A quantization-width (step-size) determining portion 211 determines a quantization-width (step size) to be used in a coding portion 212. A coded-data amount determining portion 213 calculates an accumulated amount of generated coded data. Generally, the quantization width is increased or decreased to prevent increase or decrease of coded data amount.

In FIG. 28 the upper-layer coding portion 203 encodes only a selected part of each frame in a received video-sequence on the basis of an area information by using an international standard video-coding method such as MPEG, H.261 and so on. However, frames encoded at the lower-layer coding portion 204 are not encoded by the upper-layer coding portion 203. The area information is information indicating a selected area of, e.g., an image of a human figure in each video frame, which is a binarized image taking 1 in the selected area and 0 outside the selected area. The upper-layer coding portion 203 also prepares decoded selected areas of each frame, which are transferred to the synthesizing portion 205.

Figure 30:
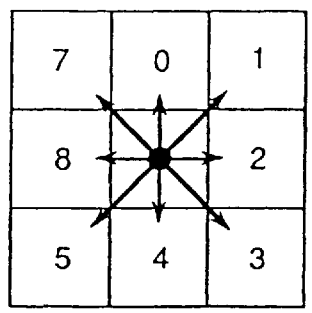
FIG. 30 is a view for explaining an 8-directional quantizing code.
Figure 31:
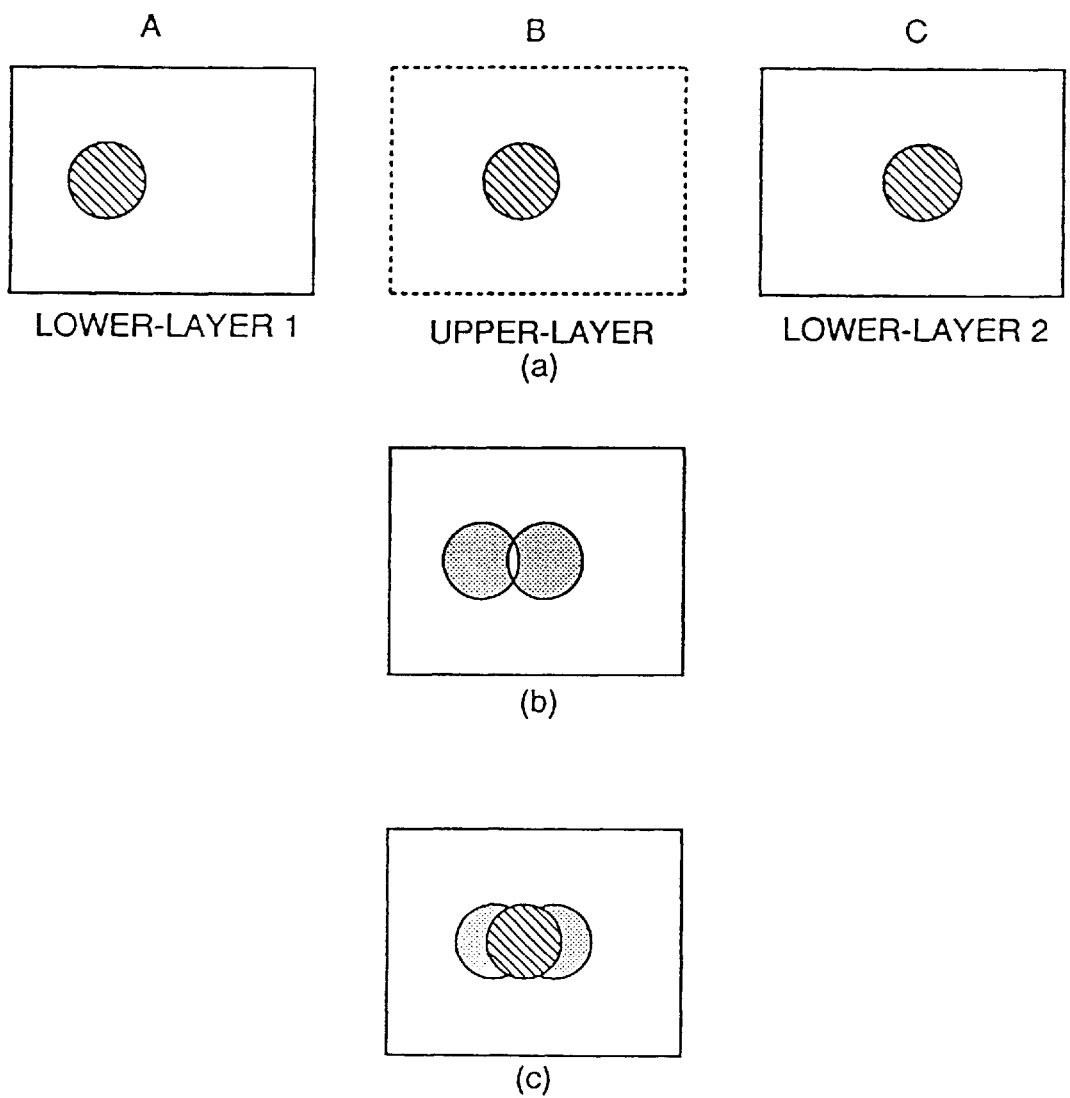
FIG. 31 is a view for explaining problems of a conventional method.

An area-information coding portion 206 encodes an area information by using 8-directional quantizing codes. The 8-directional quantizing code is a numeric code indicating a direction to a proceeding point as shown in FIG. 30 and it is usually used for representing digital graphics.

A synthesizing portion 205 outputs a decoded lower-layer video-frame which has been encoded by lower-layer coding portion and is to be synthesized. When a frame to be synthesized but has not been encoded at the lower-layer coding portion, the synthesizing portion 205 outputs a decoded video-frame that is generated by using two decoded frames, which have been encoded at the lower-layer and stand before and after the lacking lower-layer frame, and one decoded upper-layer frame to be synthesized. The two lower-layer frames stand before and after the upper-layer frame. The synthesized video-frame is inputted into the upper-layer coding portion 203 to be used therein for predictive coding. The image processing in the synthesizing portion 203 is as follows:

An interpolating image is first prepared for two lower-layer frames. A decoded image of the lower-layer at time t is expressed as B(x,y,t), where x and y are co-ordinates defining the position of a pixel in a space. When the two decoded images of the lower-layer are located at time t1 and t2 and the decoded image of the upper-layer is located at t3 (t1<t3<t2), the interpolating image I(x,y,t3) of time t3 is calculated according to the following equation (1):

$$I(x,y,t3)=[(t2-t3)B(x,y,t1)+(t3-t1)B(x,y,t2)]/(t2-t1)+\text{tm} \quad (1)$$

The decoded image E of the upper layer is then synthesized with the obtained interpolating image I by using synthesizing weight information W(x,y,t) prepared from area information. A synthesized image S is defined according to the following equation:

$$S(x,y,t)=[1-W(x,y,t)]I(x,y,t)+E(x,y,t)W(x,y,t) \quad (2)$$

The area information M(x,y,t) is a binarized image taking 1 in a selected area and 0 outside the selected area. The weight information W(x,y,t) can be obtained by processing the above-mentioned binarized image several times with a low-pass filter. Namely, the weight information W(x,y,t) takes 1 within a selected area, 0 outside the selected area and a value of 0 to 1 at boundary of the selected area.

The coded data prepared by the lower-layer coding portion, the upper-layer coding portion and the area information coding portion is integrated by an integrating portion (not shown) and then is transmitted or accumulated.

In the decoding side of the conventional system, a coded data disassembling portion (not shown) separates coded data into lower-layer coded data, upper-layer coded data and area-information coded data. These coded data are decoded respectively by an lower-layer decoding portion 208, an upper-layer decoding portion 207 and an area information decoding portion 209.

A synthesizing portion 210 of the decoding side is similar in construction to the synthesizing portion 205. It synthesizes an image by using a decoded lower-layer image and a decoded upper-layer image according to the same method as described at the coding side. The synthesized video frame is displayed on a display screen and, at the same time, is inputted into the upper layer decoding portion 207 to be used for prediction thereat.

The above-described decoding device decodes both lower-layer and the upper-layer frames, but a decoding device consisting of an lower-layer decoding portion is also applied, omitting the upper-layer coding portion 204 and the synthesizing portion 210. This simplified decoding device can reproduce a part of coded data.

Figure 32:
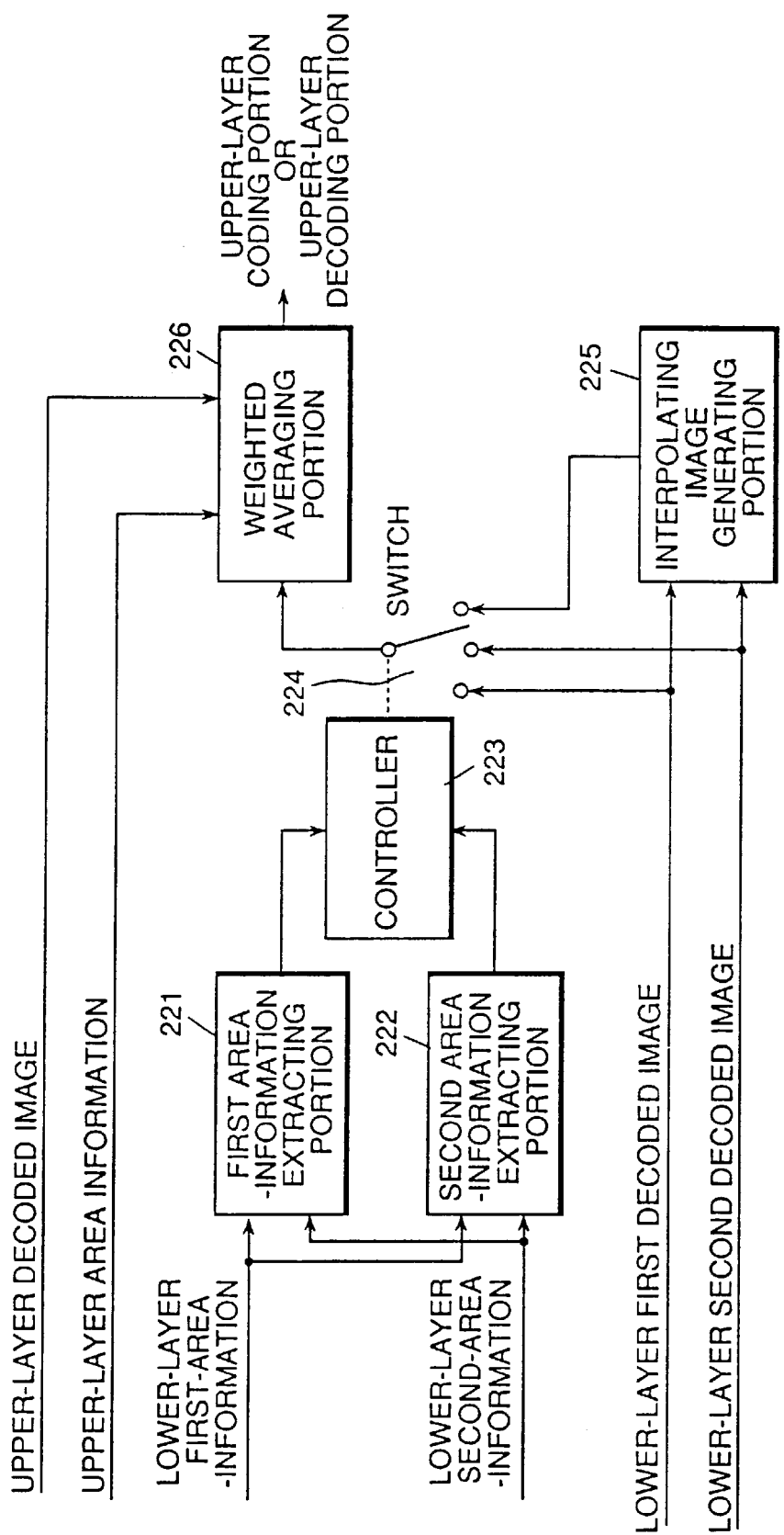
FIG. 32 is a block diagram for explaining an embodiment of the present invention.

This embodiment of the present invention is intended to solve a problem that may occur in a synthesizing portion 205 shown in FIG. 28. This embodiment also relates a video-synthesizing device which is capable of synthesizing an image from two lower-layer decoded frames and one upper-layer decoded selected area or areas without occurrence of afterimage-like distortion around the selected area or areas. FIG. 32 is a block diagram showing an image synthesizing device that is an embodiment of the present invention.

Figure 33:
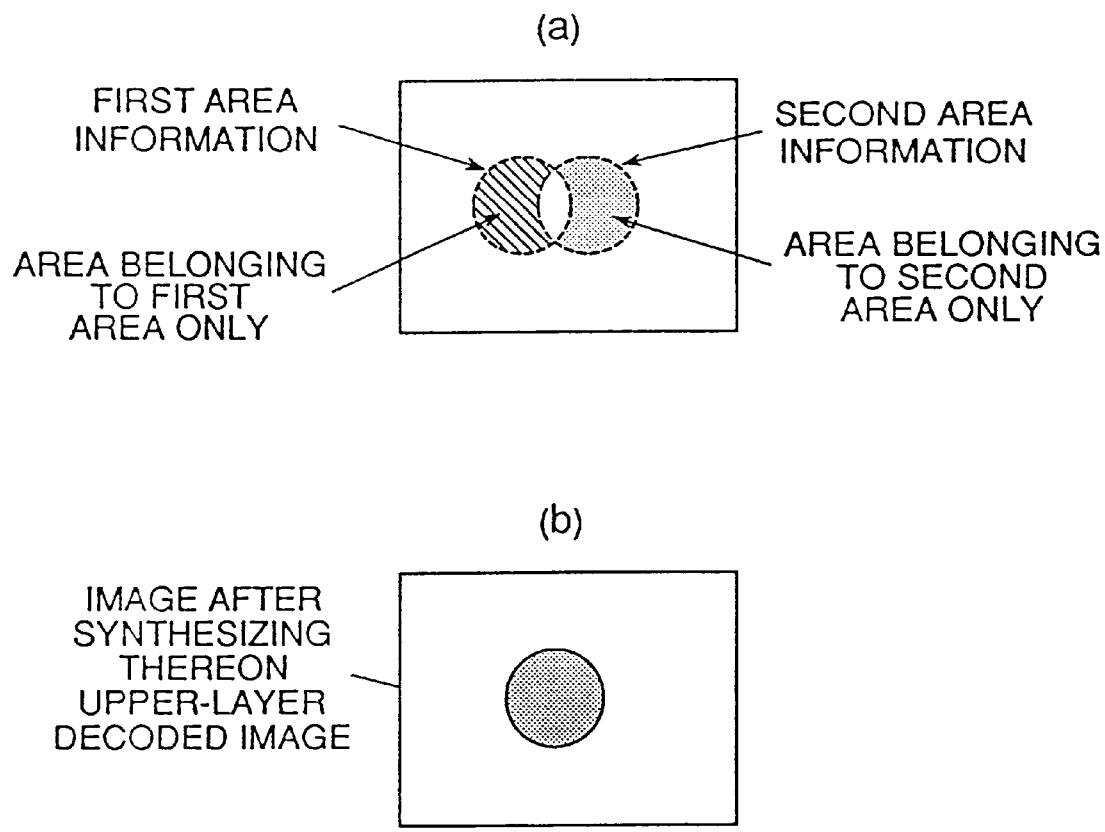
FIG. 33 is a view for explaining effects of an embodiment of the present invention.

In FIG. 32, a first area-extracting portion 221 is to extract an area, which relates to a first area and does not relate to a second area, from a first area information of an lower-layer frame and a second area information of an lower-layer frame. In FIG. 33(a), the first area information is shown by a dotted line (0 within the dotted area and 1 outside the dotted area) and the second area information is shown by a broken line (with similar numeral codes). Consequently, an area to be extracted by the first area extracting portion 221 is a hatched part shown in FIG. 33.

A second area extracting portion 222 of FIG. 32 is intended to extract an area, which relates to the second area and does not relate to the first area, from a first area information of an lower-layer frame and a second area information of an lower-layer frame. Namely, a dotted area shown in FIG. 33(a) is extracted.

In FIG. 32, a controller 223 controls a switch 224 according to an output of the first area extracting portion and the second area extracting portion. Namely, the switch 221 is connected to a second decoded image side when the position of a remarkable pixel relates to only the first area and it is connected to a first decoded image side when the remarkable pixel relates to only the second area. The switch is connected to an output of interpolation-image generating portion 225 when the remarkable pixel does not relate to the first and second areas.

The interpolation-image generating portion 225 calculates an interpolating image between the first decoded lower-layer image and the second decoded lower-layer image according to the equation (1) defined as the above. In Equation (1), the first decoded image is expressed as B(x,y,t1), the second decoded image is expressed as B(x,y,t2) and the interpolating image is expressed as B(x,y,t3). "t1", "t2" and "t3" are time marks of the first decoded image, second decoded image and interpolating image respectively.

Referring to FIG. 33(a), the interpolating image thus generated is featured by that the hatched area is filled with a background image, outside the selected area, of the second decoded frame, a dotted area is filled with a background image, outside the selected area, of the first decoded frame, and other portions are filled with the interpolating image between the first and second decoded frames. The upper-layer decoded image is then overlaid on the above-mentioned ion 226 shown in FIG. 32 to produce a synthesized image shown in FIG. 33(b), which has no after image around the selected (hatched) area and is free from the distortion occurred in the prior art image. The weighted averaging portion 226 combines the interpolating image with the upper-layer decoded image by using weighted means. The weighted averaging method was described before.

In the above-described embodiment, it is also possible to use, instead of the mean-weighting portion 225, pixel values of either the first decoded image B(x,y,t1) or the second decoded image B(x,y,t2), which is temporally nearer to the time mark t3 of the upper-layer image. In this instance, the interpolating image I may be expressed by using frame number as follows:

I(x,y,t3)=B(x,y,t1) in case of t3−t1<t1−t2 or I(x,y,t3)=B(x,y,t2) in all other cases.

In the expressions, t1, t2 and t3 denote time marks of the first decoded image, the second decoded image and the upper-layer decoded image.

Figure 34:
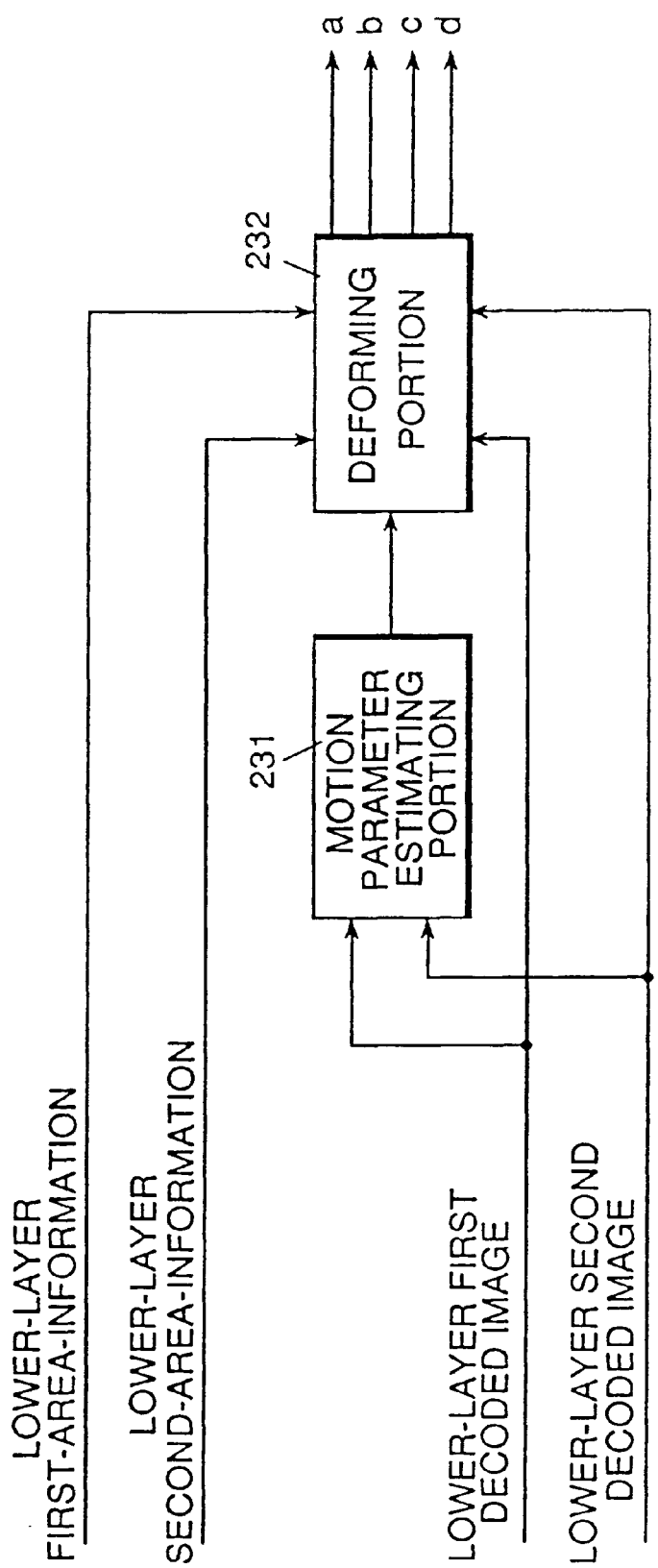
FIG. 34 is a block diagram for explaining another embodiment of the present invention.

Another embodiment of the present invention will be described as follows:

This embodiment relates to an image synthesizing device which is based on the first embodiment and is capable of generating a more accurate synthesized image with consideration of motion information of lower-layer decoded images. FIG. 34 is a block diagram showing a device for predicting a motion parameter and modifying area information of two corresponding frames.

In FIG. 34, a motion-parameter estimating portion 231 estimates information about the motion from a first lower-layer decoded image to a second lower-layer decoded image by determining motion parameters, e.g., motion vector per block and a whole image movement (parallel displacement, rotation, enlargement and contraction).

An area-form modifying portion 232 modifies the first decoded image, the second decoded image, the first area information and the second area information according to respective predicted motion parameters based on the temporal positions of the synthesizable frames. For example, a motion vector (MVx,MVy) from the first decoded image to the second decoded image will be determined as a motion parameter. MVx is a horizontal component and MVy is a vertical component. A motion vector from the first decoded image to the interpolating image is determined according to the equation: (t3−t1)/(t2−t1)(MVx,MVy). The first decoded image is then shifted according to the obtained vector. In case of using other motion parameters such as rotation, enlargement and contraction, the image is not only shifted but also be deformed. In FIG. 34, the deformed (modified) data sets "a", "b", "c" and "d", which relate respectively to the first decoded image, the second decoded image, the first area information and the second area information of FIG. 32. These data sets are inputted into the image synthesizing device shown in FIG. 32, which generates a synthesized image. Although the above-described embodiment predicts the motion parameters from two decoded images, it may also use a motion vector of each block of each image, which is usually included in coded data prepared by predictive coding. For example, a mean value of the decoded motion vectors may be applied as a motion vector of a whole image from the first decoded frame to the second decoded frame. It is also possible to determine a frequency distribution of decoded motion vectors and to use a vector of highest frequency as a motion parameter of a whole image from the first decoded frame to the second decoded frame. The above-mentioned processing is performed independently in a horizontal direction and a vertical direction.

Figure 35:
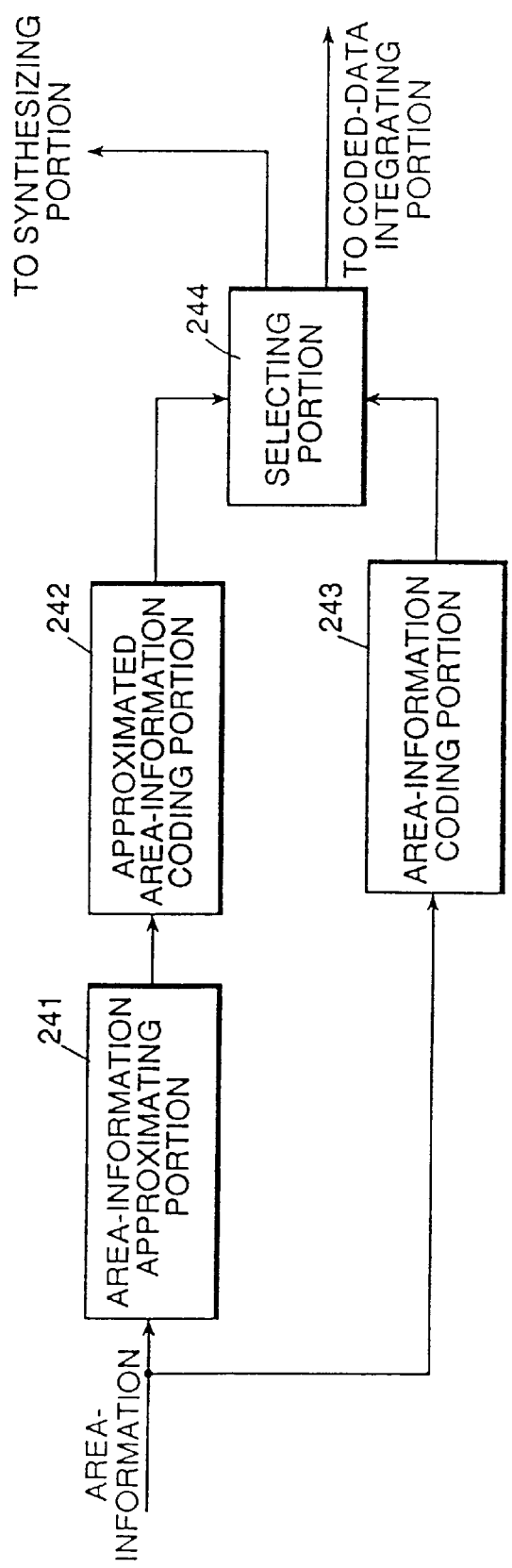
FIG. 35 is a block diagram for explaining a coding side of another embodiment of the present invention.
Figure 36:
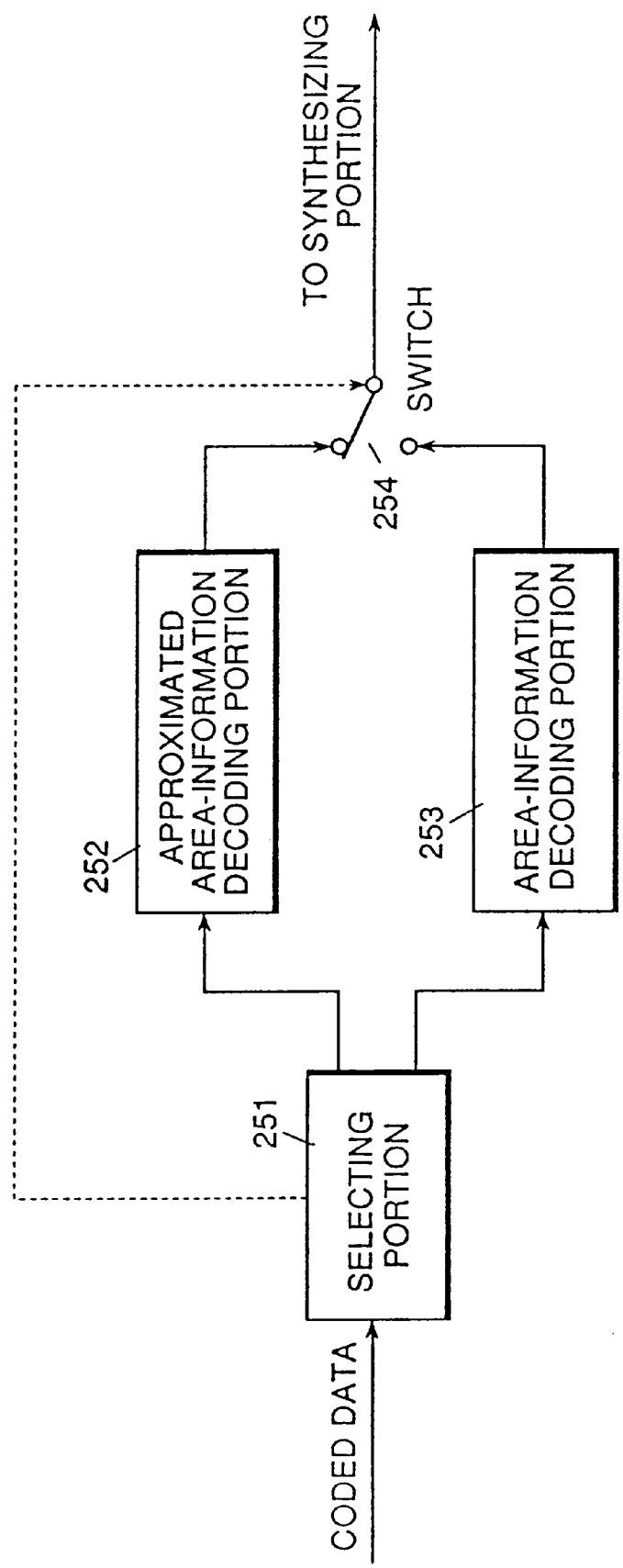
FIG. 36 is a block diagram for explaining a decoding side of another embodiment of the present invention.

Another embodiment of the present invention is as follows:

This embodiment relates to an area-information coding device being capable of effectively encoding an area information. FIGS. 35 and 36 are block diagrams of this embodiment whose coding side is shown in FIG. 35 and decoding side is shown in FIG. 36.

In FIG. 35, an area-information approximating portion 241 approximates an area information by using a plurality of geometrical figures. FIG. 37 shows an example of approximation of an area information of a human figure (hatched portion) with two rectangles. One rectangle 1 represents a head of a person and the other rectangle 2 represents a breast portion of the person.

An approximated-area information coding portion 242 encodes the approximated area-information. An area approximated by rectangles as shown in FIG. 37 may be encoded with a fixed code length by encoding coordinates of a left top point of each rectangle and a size of each rectangle with a fixed code length. An area approximated by an ellipse may be encoded at a fixed code length by encoding coordinates of its center, long axis length and short axis length. The approximated area-information and the coded data are sent to a selecting portion 244.

Like the area-information coding portion 206 described in FIG. 28, an area-information coding portion 243 of FIG. 35 encodes an area-information by using an 8-directional quantizing code without approximation. The area information and the coded data are sent to a selecting portion 244.

The selecting portion 244 selects either one of two outputs 242 and 243. With the output 243 being selected, the coded data of the approximated area information with single-bit (e.g., 1) selection information is sent to a coded-data integrating portion (not shown) and approximated area information is sent to a synthesizing portion (not shown). With the output 344 being selected, the coded data of the not-approximated area information with one bit (e.g., 1) of selection information is sent to a coded-data integrating portion (not shown) and the not-approximated area information is sent to a synthesizing portion according to the present invention.

The selecting portion may operate, for example, to select an output which may produce smaller amount of coded data or to select the output 244 when an amount of coded data of the not-approximated information does not exceed a threshold value and the output 242 when said amount exceeds said threshold value. This makes it possible to reduce the amount of coded data, preventing the area information from being distorted.

The operation of the decoding side of this embodiment is as follows:

In FIG. 36, a selecting portion 251 selects which kind of area-information—approximated or not-approximated—according to the single-bit selecting information contained in the received coded data.

In FIG. 36, an approximated-area-information decoding portion 252 decodes the approximated area information, whereas an area-information decoding portion 253 decodes the not-approximated area information. A switch 254 is controlled by a signal from the selecting portion 251 to select an approximated area-information or not-approximated area-information as an output to a synthesizing portion.

Either approximated area information or not-approximated area information is thus adaptively selected, encoded and decoded. When area information is complicate and may produce a large amount of coded data, the approximated area-information is selected to encode the area-information with a small amount of information.

In the above-mentioned case, the not-approximated area information is encoded by using 8-directional quantizing codes, but it may be more effectively encoded by using a combination of 8-directional quantization with predictive coding. An 8-directional quantizing code takes 8 values from 0 to 7 as shown in FIG. 30, which are differentiated to be from −7 to 7 by predictive coding. A difference, however, may be limited to a range of −3 to 4 by adding 8 if the difference being −4 or less and by subtracting 8 if the difference is more than 4. In decoding, an original 8-directional quantization value can be obtained by first adding the difference to the precedent value and then by subtracting or adding 8 when the result is negative value or exceeds 7. An example is shown below:

| | |
|---|---|
| 8-directional quantization value | 1, 6, 2, 1, 3 . . . |
| Difference | 5, −4, −1, −2 . . . |
| Converted value | −3, 4, −1, 2, . . . |
| Decoded value | 1, 6, 2, 1, 3, . . . |

For example, a difference between a quantization value 6 and a precedent value is 5 from which 8 is subtracted to obtain a result of −3. In decoding, −3 is added to the precedent value 1 and a value −2 is obtained, which is negative and therefore is increased by adding 8 thereto to finally obtain a decoded value 6. Such predictive coding is effected by utilizing the cyclic feature of the 8-directional coding.

Although this embodiment encodes an approximated area-information of each image independently, it is possible to increase the efficiency of coding using the preceding coding result because video frames usually have a high interframe correlation. Namely, only a difference of approximated area information of two successive frames is encoded if the approximated area information is continuously encoded between two frames. When, for example, an area is approximated by a rectangle, a rectangle of a preceding frame is expressed by its left-top position (19, 20) and size (100, 150) and a rectangle of a current frame is expressed by its left-top position (13, 18) and size (100, 152), a differential left-top position (3, 2) and differential size (0, 2) of the current frame is encoded. If a change of an area shape is small, an amount of coded data for the area information can be considerably saved by using entropy coding, e.g., Huffman coding because differences concentrate near to 0 at a small change of an area shape. When a rectangle may not vary in many times, it is effective to encode single-bit information as rectangle change information on a current frame. Namely, single-bit information (e.g., 0) is encoded for current frame whose rectangle does not vary, whereas single-bit information (e.g., 1) and difference information are encoded for frames whose rectangle varies.

Figure 38:
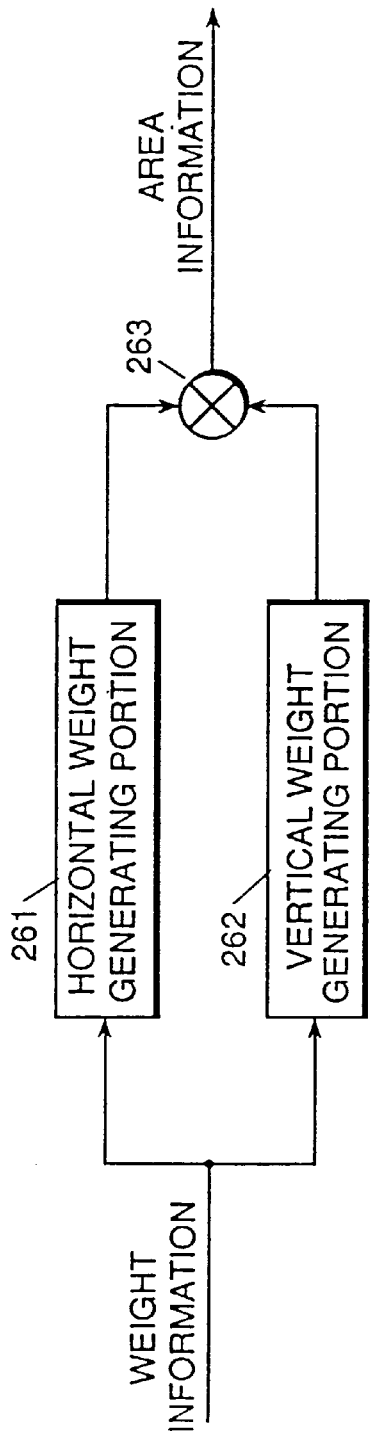
FIG. 38 is a block diagram for explaining another embodiment of the present invention.

Another embodiment of the present invention is as follows:

This embodiment relates to a weight-information generating device for preparing many-valued weight information from an area information. FIG. 38 is a block diagram of this embodiment.

In FIG. 38, a horizontal weight generating portion 261 horizontally scans an area information and detects 1 therein, then calculates a corresponding weight function. In practice, the abscissa xO of a left-end point and the horizontal length N of the area are first determined and then a horizontal weight function is calculated as shown in FIG. 39(a). The weight function may be prepared by combining straight lines or by combining a line with a trigonometric function. An example of the latter case is described below. If N>W (W is a width of a trigonometric function), the following weight functions may be applied:

$\sin[(x+\frac{1}{2})\pi/(2W)] \times \sin[(x+\frac{1}{2})\pi/(2W)]$ if $0 \leq x < W$;
1 if $W \leq x < N-W$;
$\sin[(x-N+2W+\frac{1}{2})\pi/(2W)] \times \sin[(x-N+2W+\frac{1}{2})\pi/(2W)]$ if $0 \leq x < W$;
$\sin 2[(x+\frac{1}{2})\pi/N] \times \sin[(x+\frac{1}{2})\pi/N]$ if $N \leq 2W$.

In the above-mentioned case, the left-end point x0 of the area is set at 0.

In FIG. 38, a vertical weight generating portion 502 vertically scans the area information and detects 1 therein, then calculates a corresponding vertical weight function. In practice, the ordinate y0 of a top-end point and the vertical length M of the area are determined, then a vertical weight function is calculated as shown in FIG. 39(b).

A multiplier 263 multiplies an output 261 by an output 262 at each pixel position to generate a weight information.

The above-mentioned method may obtain a weight information adapted to the form of the area information with a reduced number of operations.

Figure 40:
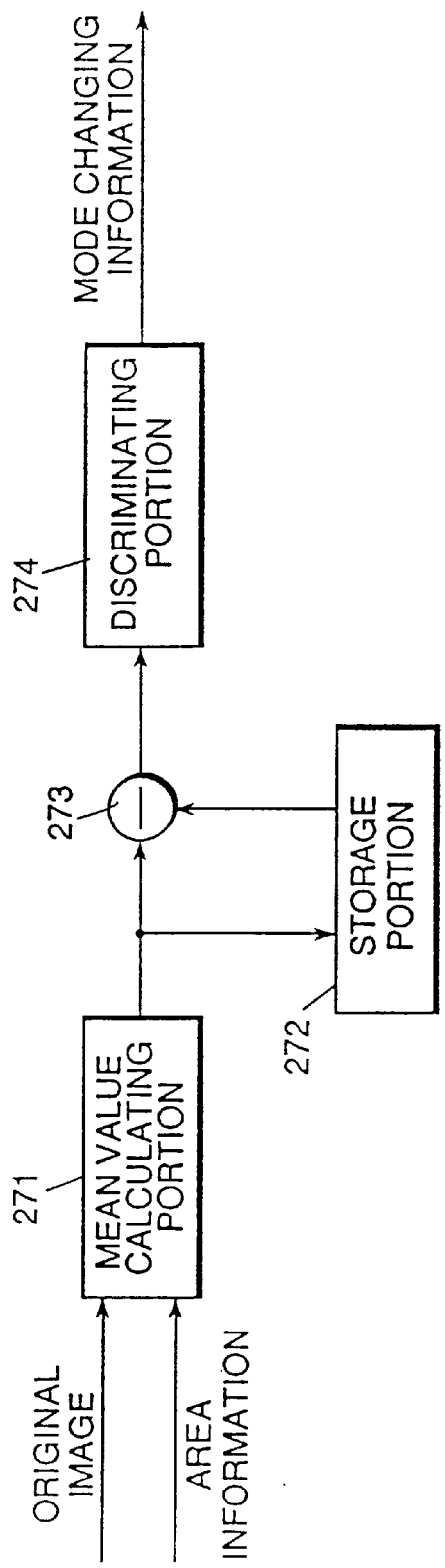
FIG. 40 is a block diagram for explaining another embodiment of the present invention.

Another embodiment of the present invention is as follows:

This embodiment relates to a method for adaptively switching coding mode from interframe prediction to intraframe prediction and vice visa in predictive coding lower-layer or upper-layer frames. FIG. 40 is a block diagram of this embodiment.

In FIG. 40, a mean-value calculating portion 271 determines a mean of pixel values in an area according to an input original image and an input area-information. The mean value is inputted into a differentiator 273 and a storage 272.

The differentiator 273 determines a difference between a preceding mean value stored in the storage 272 and a current mean value outputted from the mean-value calculating portion 271.

A discriminating portion 274 compares an absolute value of the difference calculated by the differentiator 273 with a predetermined threshold value and outputs a mode-selecting information. With the absolute value of the difference being larger than the threshold, the discriminating portion 273 judges that a scene change occurs in a selected area and generates a mode selecting signal to always conduct the intraframe prediction coding.

Mode selection thus effected by judging a scene change of a selected area is effective to obtain high-quality coded images even when, for example, a person appears from behind the cover or any matter is turn over. The shown embodiment can be applied for system for coding a selected area separately from other areas in encoding lower-layer frames. In this case, area information is inputted into the lower-layer coding portion. This embodiment can be also applied for coding only a selected area of the upper-layer frame.

Figure 41:
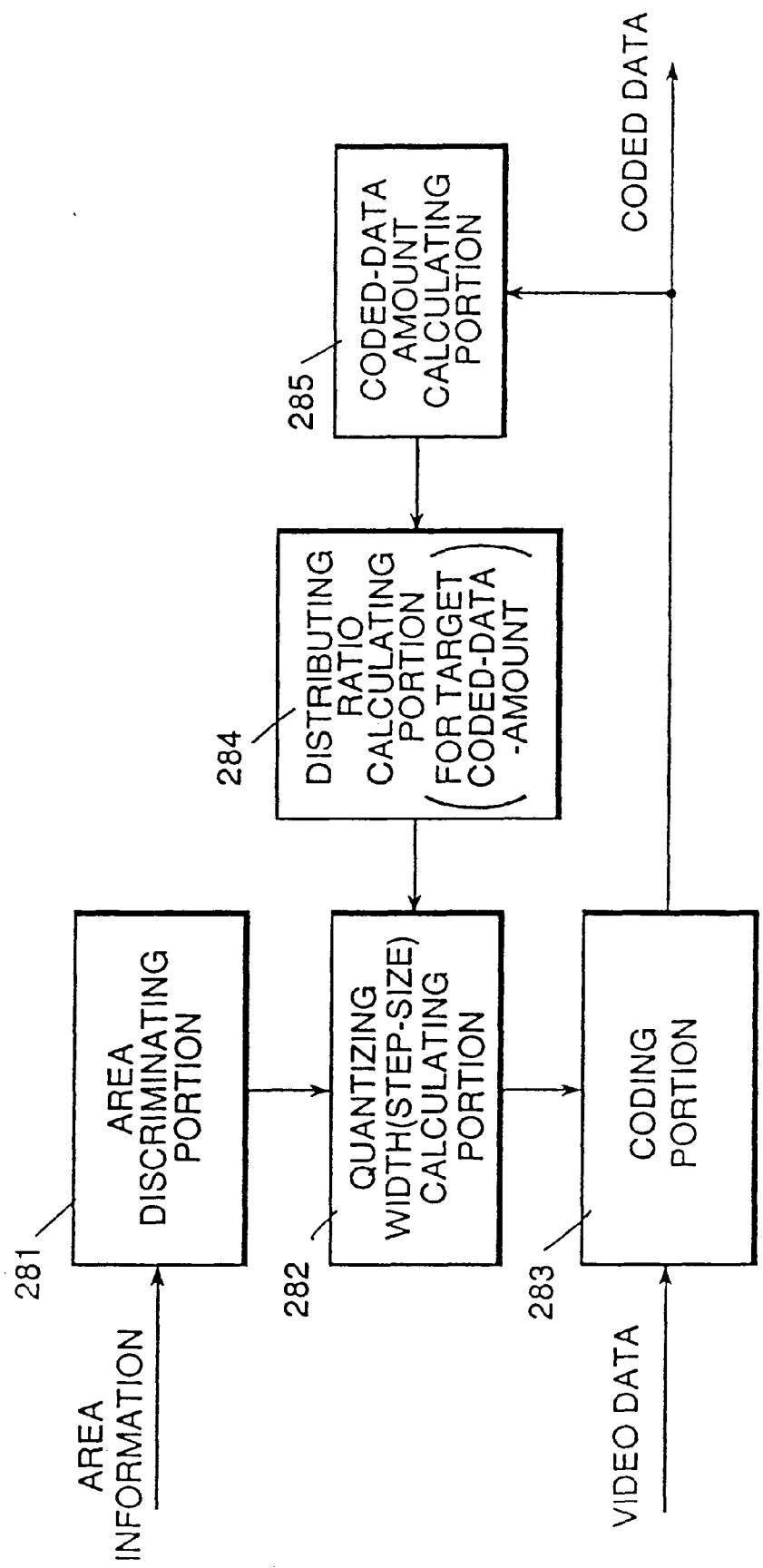
FIG. 41 is a block diagram for explaining another embodiment of the present invention.

Another embodiment of the present invention is as follows:

This embodiment relates to a method for controlling an amount of data in case of encoding a separate area separately from other areas of each lower-layer frame. FIG. 41 is a block diagram of this embodiment.

In FIG. 41, a coding portion 283 separates a selected area from other areas and encodes it. An area discriminating portion 281 receives an area information and discriminates whether the encodable area is within or outside the selected area. A coded-data-amount estimating portion 285 estimates an amount of coded data in each area on the basis of the above-mentioned discrimination result. A distributing ratio calculating portion 284 determines distributing ratios of a target amount of codes per frame, which will be allocated to areas. The method for determining distributing ratios will be described later. A quantizing width calculating portion determines a quantizing step-size according to the target amount of coded data. The method for determining quantizing step-size is the same as the conventional method.

The method for determining a code distributing ratio by the target code-allocation calculating portion is as follows:

A target code-amount Bi of a frame is calculated according to the following equation:

$$Bi = (\text{The number of usable bits} - \text{The number of bits used for coding preceding frames}) / \text{The number of remaining frames}$$

This target number Bi of bits is distributes at a specified ratio to pixels within a selected area and pixels outside the selected area. The ratio is determined by using an adequate fixed ratio RO and a preceding frame complexity ratio Rp. The complexity ratio Rp of the preceding frame is calculated by the following equation:

$$Rp = (gen\_bitF \ast avg\_qF)/(gen\_bitF \ast avg\_qF + gen\_bitB \ast avg\_qB)$$

where gen_bitF=The number of bits for coding pixels in a selected area of a preceding frame, gen_bitB=The number of bits for coding pixels outside the selected area of a preceding frame, avg_qF=An average quantization step-size in the selected area of a preceding frame and avg_qB= An average quantization step-size outside the selected area of a preceding frame. To encode a selected area at a high image quality, it is desirable to adjust a quantizing step size to keep an average quantizing step-size in the selected area somewhat smaller than that outside the selected area and at the same time to follow up the change of an image in a sequence of moving pictures. Generally, distribution at a fixed ratio RO is adapted to maintain a substantially constant relation of quantization step-size between pixels in the selected area and pixels outside the selected area, while distribution at a complexity ratio Rp of a preceding frame is adapted to following up the change of an image in a sequence of moving pictures. Accordingly, the present invention is intended to use a combination of advantages of both methods by making a target-bit-amount distributing ratio be an average of the fixed ratio RO and the preceding frame complexity ratio Rp. Namely, the distribution ratio Ra is determined as follows: Ra=(RO+Rp)/2

Figure 42:
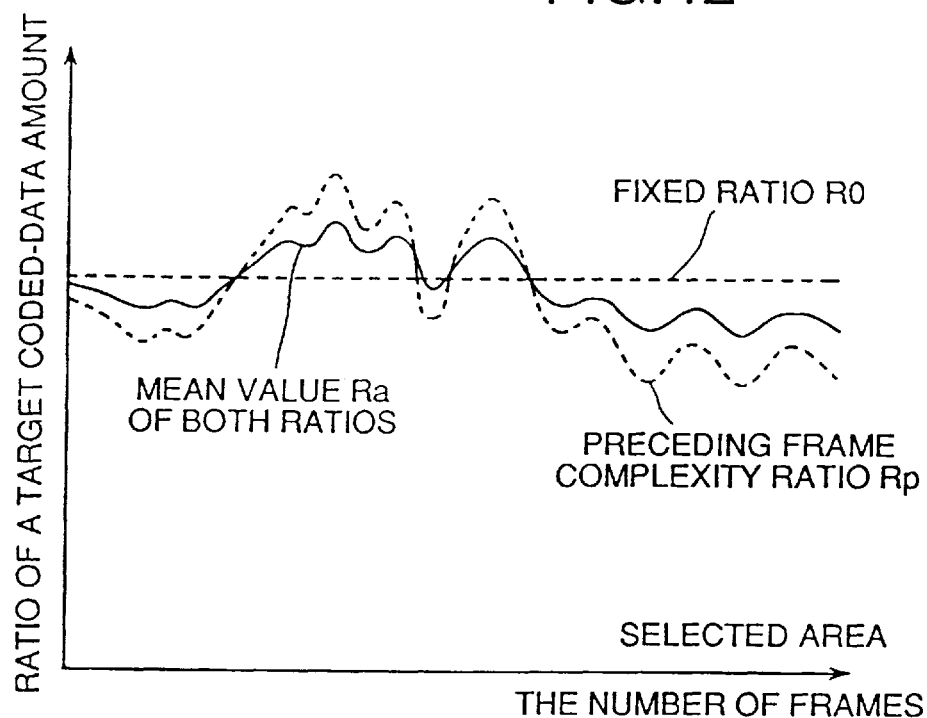
FIG. 42 is a view for explaining a target coefficient of codes usable for coding a selected area by a code-amount controlling method according to the present invention.
Figure 43:
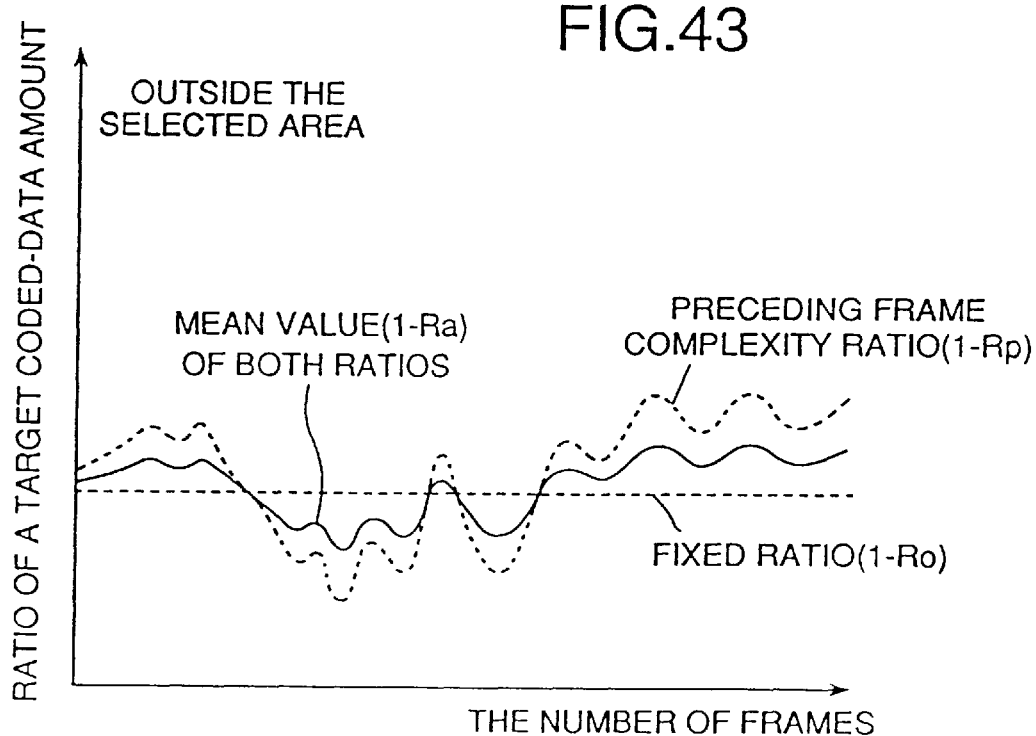
FIG. 43 is a view for explaining a target coefficient of codes usable for coding an area outside a selected area by a code-amount controlling method according to the present invention.

In FIG. 42, there are two exemplified curves plotted by dotted lines, which represent the fixed ratio RO and the preceding frame complexity ratio Rp in a selected area for a whole video sequence. In this example, a solid-line curve of FIG. 42 relates to the obtainable ratio Ra for distributing a target coded-data-amount, which does not so far part from the curve of fixed ratio and reflects, to a certain extent, a change of an image in a video sequence. At a fixed ratio (1-RO) and preceding frame complexity ratio (1-Rp) for the outside of the selected area, an average ratio, which is a target-bit-amount distributing ratio (1-Ra) for pixels outside the selected area, takes a solid-line-plotted curve shown in FIG. 43. A total of two target-bit-amount distributing ratios for pixels in and out of a selected area takes 1.

The quantization step-size can be thus adaptively controlled. A bit rate of a whole video sequence, however, may some time exceed a predetermined value because the number of bits used exceeds the target value Bi in some frames. In this case, the following method may be applied.

Figure 44:
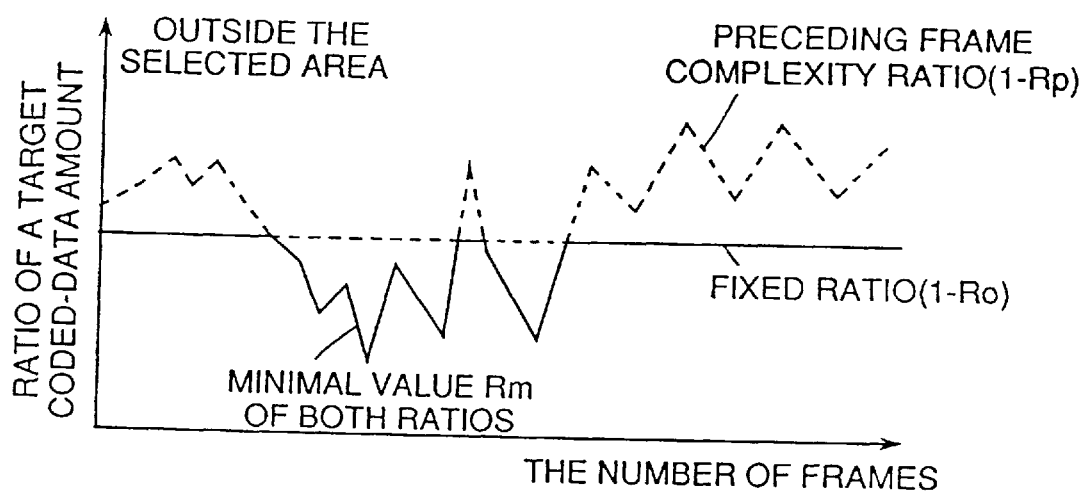
FIG. 44 is a view for explaining a target coefficient of codes usable for coding an area outside a selected area by a code-amount controlling method according to the present invention.

As described above, the target-bit-amount distributing ratio Ra for coding pixels in a selected area is a mean value of the fixed ratio RO and the preceding complexity ratio Rp, whereas the target-bit-amount distributing ratio Rm for coding pixels outside the selected area is a minimal value Rm of the fixed ratio (1-RO) and preceding frame complexity ratio (I-Rp) for coding pixels outside the selected area. In this case, the target-bit-amount distributing ratio (1-Ra) for coding pixels outside the selected area may vary, for example, as shown by a solid line in FIG. 44. As Ra+Rm≦1 the target number of bits can be reduced for a frame or frames wherein excess bits may occur. In other words, the bit rate of a whole video sequence may be kept within the predetermined limit by reducing the target bit-amount of a background area of a frame or frames.

With the video coding and decoding devices according to the present invention, it is possible to encode a selected area of an image to be of a higher quality than that of other areas.

It is possible to decode only a selected area with a lower image quality if only lower-layer coded data is decoded.

In decoding upper-layer coded data, it is possible to select which the first upper-layer or the second upper-layer is decoded. A whole image is decoded to be of a lower image-quality if the first layer is selected, whereas only a selected area is decoded to be of a high image-quality if the second upper-layer is selected.

In decoding all coded data, an image can be decoded in such a way that a selected area of the image may have a higher image quality than that of all other areas thereof.

Although the above-described preferred embodiments of the present invention presumed that the decoding device receives all coded data, but it may be also adapted to such a case that, in a video communication system, a decoding terminal requests a coding side to send a limited data, e.g., coded data on an area position and shape, coded data of the lower-layer and coded data of the first layer to communicate over a transmission line of a narrow bandwidth. Namely, the present invention realizes such data communication that transmits only the lower-layer data over a transmission line of a very narrow bandwidth or selectively transmits any one of two kinds of upper-layer data over a line of some wider bandwidth or transmits all kinds of data over a line of further wider bandwidth.

With the video-coding device according to the present invention, it is possible to reduce an amount of coded data because weighted mean information is prepared from binarized information inputting a plurality of part video-sequences onto a background video-sequence by using the weighted mean values. Because the weighted mean data prepared from the binarized information gets a value of 0 to 1, a boundary between the part images and the background images can be smoothly synthesized without occurrence of any visual defect.

In weighting still-not-coded data using weight values to be used for synthesizing video-sequences, the amount of coded data can be reduced or the quality of decoded image can be improved at the same amount of the coded data as compared with the prior art devices.

The video-coding device according to the present invention is intended to:

(1) synthesize a not-coded lower-layer frame from preceding and proceeding lower-layer frames by weighted averaging two lower-layer frames existing temporally before and after the synthesizable frame for an overlapped portion of a first part area with a second parts area or an area not belonging to the first part area and the second part area, by using an lower-layer frame existing temporally after the synthesizable frame for a part of only the first part area and by using an lower-layer frame existing temporally before the synthesizable frame for a part of only the second part area, thereby obtaining a synthesized image of a high quality with no distortion even when an object moves;

(2) synthesize the lower-layer frame (1) by using an lower-layer frames existing temporally near to the synthesizable frame for an overlapped portion of a first part area with a second parts area or an area not belonging to the first part area and the second part area or by using only a first lower-layer frame or only a second lower-layer frame, thereby obtaining a synthesized image of a high quality with no double vision of the synthesized background image even when the background image moves;

(3) synthesize the lower-layer frame (1) by modifying (deforming) the first lower-layer frame, the second lower-layer frame, the first part area and the second part area by motion compensation of motion parameters based on the temporal position of the synthesizable lower-layer frame, thereby obtaining a synthesized image of a high quality to follow the movement of a background image of the lower-layer frames;

(4) synthesize the lower-layer frame (3) by using motion vector information obtained by motion compensative prediction coding, thereby obtaining a motion parameter with reduced amount of processing than the case of newly predicting a motion parameter;

(5) adaptively selecting either approximating the area information by a plurality of geometrical figures or encoding without approximation, thereby effectively encoding and decoding area information;

(6) convert area information (5) into eight-directional quantized data, determine a difference between the eight-directional quantized data and encode and decode the difference data by variable-length coding, thereby more efficiently conducting reversibly coding and decoding area information;

(7) further efficiently encode and decode approximated area information (5) by determining interframe difference of geometrical figure information, encode and decode by variable-length coding method, adding information indicating no change of area-information without encoding other area information when the difference data being all 0;

(8) horizontally scan area information to detect a length of each line therein and determine a horizontal weight function; vertically scan the area information to detect a length of each line thereof and determine a vertical weight function; generate many-valued weight information, thereby efficiently generate weight information by a weight-information generating device when synthesizing an upper-layer part-image with an lower-layer frame by weighted averaging method;

(9) encode and decode video frames by using area information indicating a shape of matter or a shape of a part, determines a mean value of pixels in an area from input image and corresponding thereto area information, calculate a difference between average values of a preceding frame and a current frame, compare the difference with a specified value and select the intraframe coding when the difference exceeds the specified value, thereby making it possible to correctly change over the coding mode from the predictive (interframe) coding to the intraframe coding when a scene change occurs and assuring a high quality of coding and decoding images:

(10) separate a video-sequence into background image areas and a plurality of foreground part-images and separately encode each separated background area and each part-image area by determining whether coded data and codable blocks exist in or out of a part area, by separately calculating the coded data amount in the part image area and the coded data amount in the background image area and by determining target-bit-amount distribution ratios for the part-image area and the background-image area, thereby assuring correct distribution of the target number of bits to obtain a high quality of coded images.

We claim:

1. A video decoding device for decoding a video image from coded data, comprising:

a coded data separating means for separately extracting a position-and-shape code of a selected area of each video image frame, a lower-layer code of a pixel value of the selected area of each video image frame, and an upper-layer code from the coded data;

an area-position-and-shape decoding means for decoding the position-and-shape code of the selected area;

a lower-layer decoding means for decoding the lower-layer code to produce a lower-layer decoded image of the selected area; and an upper-layer decoding means for decoding the upper-layer code by using the lower-layer decoded image to produce a decoded image of the whole area of the video image;

wherein the video decoding device reproduces the lower-layer decoded image of the selected area and the decoded image of the whole area.

2. The video decoding device according to claim 1, wherein the upper-layer code predictively encodes a pixel value of a whole area of each video image frame by using a decoded pixel value of the lower-layer code from the coded data.

3. The video decoding device according to claim 1, wherein the lower-layer code, upper-layer code, lower-layer decoded image of the selected area and decoded image of the whole area are of low image quality.

4. A video decoding device for decoding a video image from coded data, comprising:

a coded data separating means for separately extracting, from the coded data, a position-and-shape code of a selected area of each video image frame, a lower-layer code of a pixel value of the selected area of each video image frame, and an upper-layer code predictively encoding a pixel value of a selected area of each video frame by using a decoded pixel value of the lower-layer code;

an area-position-and-shape decoding means for decoding the position-and-shape code of the selected area;

a lower-layer decoding means for decoding the lower-layer code to produce a lower-layer decoded image of the selected area; and an upper-layer decoding means for decoding the upper-layer code by using the lower-layer decoded image to produce a decoded image of the whole area of the video image;

wherein the video decoding device reproduces the lower-layer decoded image of the selected area and the decoded image of the whole area.

5. The video decoding device according to claim 4, wherein the lower-layer code, upper-layer-code, lower-layer decoded image of the selected area and decoded image of the whole area are of low image quality.

6. A video decoding device for decoding a video image from coded data, comprising:

a coded data separating means for separately extracting, from the coded data, a position-and-shape code of a selected area of each video image frame, a lower-layer code of a pixel value of the selected area of each video image frame, and an upper-layer code predictively encoding a pixel value of a selected area of each video frame by using a decoded pixel value of the lower-layer code;

an area-position-and-shape decoding means for decoding the position-and-shape code of the selected area;

a lower-layer decoding means for decoding the lower-layer code to produce a first decoded image of the selected area; and an upper-layer decoding means for decoding the upper-layer code by using the lower-layer decoded image to produce a second decoded image of the selected area;

wherein the video decoding device reproduces the first and second decoded images of the selected area.

7. The video decoding device according to claim 6, wherein the first decoded image of the selected area is of low quality, adn wherein the second decoded image of the selected are is of high quality.

* * * * *

UNITED STATES PATENT AND TRADEMARK OFFICE
CERTIFICATE OF CORRECTION

PATENT NO. : 6,023,299

DATED : February 8, 2000

INVENTOR(S): H. Katata et al.

It is certified that error appears in the above-identified patent and that said Letters Patent are hereby corrected as shown below:

Column 28, line 59, after "reproduces" insert --and selectively outputs--;

Column 28, line 63, delete "adn" and insert --and--;

Column 28, line 64, delete "are".

Signed and Sealed this

Twenty-seventh Day of March, 2001

Attest:

Attesting Officer

NICHOLAS P. GODICI

Acting Director of the United States Patent and Trademark Office